United States Patent
Kadous et al.

(10) Patent No.: US 9,867,194 B2
(45) Date of Patent: Jan. 9, 2018

(54) DYNAMIC UE SCHEDULING WITH SHARED ANTENNA AND CARRIER AGGREGATION

(71) Applicant: QUALCOMM Incorporated, San Diego, CA (US)

(72) Inventors: Tamer Adel Kadous, San Diego, CA (US); Ashok Mantravadi, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 234 days.

(21) Appl. No.: 13/915,389

(22) Filed: Jun. 11, 2013

(65) Prior Publication Data

US 2013/0329665 A1    Dec. 12, 2013

Related U.S. Application Data

(60) Provisional application No. 61/658,870, filed on Jun. 12, 2012.

(51) Int. Cl.
*H04W 72/04* (2009.01)
*H04L 5/00* (2006.01)
(Continued)

(52) U.S. Cl.
CPC ........ *H04W 72/048* (2013.01); *H04B 7/0413* (2013.01); *H04L 5/001* (2013.01); *H04L 5/0007* (2013.01); *H04L 5/0023* (2013.01); *H04L 5/0091* (2013.01); *H04W 28/04* (2013.01); *H04W 72/04* (2013.01); *H04W 72/1284* (2013.01)

(58) Field of Classification Search
CPC ...... H04L 5/0007; H04W 28/04; H04W 72/04
See application file for complete search history.

(56) References Cited

U.S. PATENT DOCUMENTS 3,911,364 A    10/1975    Langseth et al.
4,035,728 A     7/1977    Ishikawa et al.
(Continued)

FOREIGN PATENT DOCUMENTS

CN    1523912 A    8/2004
CN    1922795 A    2/2007
(Continued)

OTHER PUBLICATIONS

International Search Report and Written Opinion—PCT/US2013/045461—ISA/EPO—dated Sep. 20, 2013.
(Continued)

*Primary Examiner* — Michael Thier
*Assistant Examiner* — Brian Cox
(74) *Attorney, Agent, or Firm* — Seyfarth Shaw LLP

(57) ABSTRACT

A system capacity improvement is achieved by dynamically selecting a particular antenna mode of operation from the multiple radio access technology modes. In some implementations, the system capacity improvement is achieved by dynamically generating an indication of a user equipment (UE) antenna capability during a communication connection. The UE's indication of its antenna capability is dynamic and/or is subject to change throughout the duration of the communication connection. The indication may be sent to a base station.

20 Claims, 13 Drawing Sheets

(51) Int. Cl.
H04W 28/04 (2009.01)
H04B 7/0413 (2017.01)
H04W 72/12 (2009.01)

(56) References Cited

U.S. PATENT DOCUMENTS

| | | |
|---|---|---|
| 4,035,729 A | 7/1977 | Perry |
| 4,246,655 A | 1/1981 | Parker |
| 4,326,294 A | 4/1982 | Okamoto et al. |
| 4,715,048 A | 12/1987 | Masamura |
| 4,742,563 A | 5/1988 | Fukumura |
| 4,756,023 A | 7/1988 | Kojima |
| 4,969,207 A | 11/1990 | Sakamoto et al. |
| 5,056,411 A | 10/1991 | Baker |
| 5,128,630 A | 7/1992 | Mijuskovic |
| 5,291,519 A | 3/1994 | Tsurumaru |
| 5,321,850 A | 6/1994 | Backstrom et al. |
| 5,345,601 A | 9/1994 | Takagi et al. |
| 5,390,342 A | 2/1995 | Takayama et al. |
| 5,559,838 A | 9/1996 | Nakagoshi |
| 5,566,364 A | 10/1996 | Mizoguchi et al. |
| 5,694,396 A | 12/1997 | Firouzbakht et al. |
| 5,697,083 A | 12/1997 | Sano |
| 5,761,613 A | 6/1998 | Saunders et al. |
| 5,794,159 A | 8/1998 | Portin |
| 5,805,643 A | 9/1998 | Seki et al. |
| 5,805,989 A | 9/1998 | Ushida |
| 5,835,853 A | 11/1998 | Enoki et al. |
| 5,940,452 A | 8/1999 | Rich |
| 5,999,815 A | 12/1999 | Tenbrook et al. |
| 5,999,990 A | 12/1999 | Sharrit et al. |
| 6,026,288 A | 2/2000 | Bronner |
| 6,040,732 A | 3/2000 | Brokaw |
| 6,044,254 A | 3/2000 | Ohta et al. |
| 6,063,961 A | 5/2000 | Kroner |
| 6,069,923 A | 5/2000 | Ostman et al. |
| 6,088,348 A | 7/2000 | Bell, III |
| 6,208,844 B1 | 3/2001 | Abdelgany |
| 6,249,687 B1 | 6/2001 | Thomsen et al. |
| 6,407,689 B1 | 6/2002 | Bazarjani et al. |
| 6,424,683 B1 | 7/2002 | Schoellhorn |
| 6,430,237 B1 | 8/2002 | Anvari |
| 6,472,947 B1 | 10/2002 | Zeitz |
| 6,473,601 B1 | 10/2002 | Oda |
| 6,522,895 B1 | 2/2003 | Montalvo |
| 6,535,725 B2 | 3/2003 | Hatcher et al. |
| 6,600,759 B1 | 7/2003 | Wood |
| 6,600,907 B1 | 7/2003 | Taguchi |
| 6,600,931 B2 | 7/2003 | Sutton et al. |
| 6,657,498 B2 | 12/2003 | Park et al. |
| 6,806,777 B2 | 10/2004 | Franca-Neto |
| 6,819,941 B2 | 11/2004 | Dening et al. |
| 6,888,888 B1 | 5/2005 | Tu et al. |
| 6,952,594 B2 | 10/2005 | Hendin |
| 6,954,446 B2 | 10/2005 | Kuffner |
| 6,983,132 B2 | 1/2006 | Woo et al. |
| 6,985,712 B2 | 1/2006 | Yamakawa et al. |
| 6,987,950 B2 | 1/2006 | Coan |
| 7,013,166 B2 | 3/2006 | Clifford |
| 7,023,272 B2 | 4/2006 | Hung et al. |
| 7,024,172 B1 | 4/2006 | Murphy et al. |
| 7,039,377 B2 | 5/2006 | Yates |
| 7,123,891 B2 | 10/2006 | Loke |
| 7,142,042 B1 | 11/2006 | Henry |
| 7,161,423 B2 | 1/2007 | Paul et al. |
| 7,167,044 B2 | 1/2007 | Li et al. |
| 7,187,239 B2 | 3/2007 | Yeh |
| 7,187,735 B2 | 3/2007 | Kent, III |
| 7,187,904 B2 | 3/2007 | Gainey et al. |
| 7,212,788 B2 | 5/2007 | Weber et al. |
| 7,224,231 B2 | 5/2007 | Wu |
| 7,260,377 B2 | 8/2007 | Burns et al. |
| 7,283,851 B2 | 10/2007 | Persico et al. |
| 7,299,021 B2 | 11/2007 | Parssinen et al. |
| 7,313,368 B2 | 12/2007 | Wu et al. |
| 7,317,894 B2 | 1/2008 | Hirose |
| 7,333,831 B2 | 2/2008 | Srinivasan et al. |
| 7,356,325 B2 | 4/2008 | Behzad et al. |
| 7,372,336 B2 | 5/2008 | Lee et al. |
| 7,403,508 B1 | 7/2008 | Miao |
| 7,444,166 B2 | 10/2008 | Sahota et al. |
| 7,454,181 B2 | 11/2008 | Banister et al. |
| 7,477,106 B2 | 1/2009 | Van Bezooijen et al. |
| 7,486,135 B2 | 2/2009 | Mu |
| 7,570,111 B1 | 8/2009 | Vagher et al. |
| 7,599,675 B2 | 10/2009 | Mu et al. |
| 7,643,847 B2 | 1/2010 | Daanen et al. |
| 7,643,848 B2 | 1/2010 | Robinett et al. |
| 7,697,905 B2 | 4/2010 | Lee et al. |
| 7,728,664 B2 | 6/2010 | Chang et al. |
| 7,751,513 B2 | 7/2010 | Eisenhut et al. |
| 7,764,726 B2 | 7/2010 | Simic et al. |
| 7,848,724 B2 | 12/2010 | Bult et al. |
| 7,869,528 B2 | 1/2011 | Robinson |
| 7,877,075 B1 | 1/2011 | Jin et al. |
| 7,911,269 B2 | 3/2011 | Yang et al. |
| 7,944,298 B2 | 5/2011 | Cabanillas et al. |
| 7,949,309 B2 | 5/2011 | Rofougaran et al. |
| 7,952,398 B2 | 5/2011 | Salcido et al. |
| 8,022,772 B2 | 9/2011 | Cassia et al. |
| 8,055,229 B2 | 11/2011 | Huang |
| 8,063,706 B2 | 11/2011 | Li et al. |
| 8,081,672 B2 | 12/2011 | Kent et al. |
| 8,090,332 B2 | 1/2012 | Sahota et al. |
| 8,090,369 B2 | 1/2012 | Kitazoe |
| 8,139,670 B1 | 3/2012 | Son et al. |
| 8,149,955 B2 | 4/2012 | Tired |
| 8,195,117 B2 | 6/2012 | Bult et al. |
| 8,208,887 B2 | 6/2012 | Lee et al. |
| 8,217,723 B2 | 7/2012 | Rajendran et al. |
| 8,242,841 B2 | 8/2012 | Zhang |
| 8,270,927 B2 | 9/2012 | Wallace et al. |
| 8,290,449 B2 | 10/2012 | Keehr et al. |
| 8,295,778 B2 | 10/2012 | Kotecha et al. |
| 8,306,494 B2 | 11/2012 | Ojo |
| 8,442,473 B1 | 5/2013 | Kaukovuori et al. |
| 8,514,015 B2 | 8/2013 | Chen |
| 8,571,510 B2 | 10/2013 | Liu et al. |
| 8,600,315 B2 | 12/2013 | Roufoogaran et al. |
| 8,626,084 B2 | 1/2014 | Chan et al. |
| 8,676,148 B2 | 3/2014 | Ogasawara |
| 8,706,069 B2 | 4/2014 | Khoini-Poorfard et al. |
| 8,995,591 B2 | 3/2015 | Gudem et al. |
| 2002/0008575 A1 | 1/2002 | Oskowsky et al. |
| 2002/0061773 A1 | 5/2002 | Adachi et al. |
| 2002/0111163 A1 | 8/2002 | Hamabe |
| 2002/0132597 A1 | 9/2002 | Peterzell et al. |
| 2002/0173337 A1 | 11/2002 | Hajimiri et al. |
| 2002/0193108 A1 | 12/2002 | Robinett |
| 2003/0076797 A1 | 4/2003 | Lozano |
| 2003/0081694 A1 | 5/2003 | Wieck |
| 2003/0125040 A1 | 7/2003 | Walton et al. |
| 2003/0148750 A1 | 8/2003 | Yan et al. |
| 2003/0157915 A1 | 8/2003 | Atkinson et al. |
| 2003/0176176 A1 | 9/2003 | Leinonen et al. |
| 2003/0203743 A1 | 10/2003 | Sugar et al. |
| 2003/0206076 A1 | 11/2003 | Hashemi et al. |
| 2003/0228851 A1 | 12/2003 | Taniguchi |
| 2004/0087290 A1 | 5/2004 | Schmidt et al. |
| 2004/0092243 A1 | 5/2004 | Hey-Shipton |
| 2004/0113746 A1 | 6/2004 | Brindle |
| 2004/0116086 A1 | 6/2004 | Huttunen |
| 2004/0121753 A1 | 6/2004 | Sugar et al. |
| 2004/0204104 A1 | 10/2004 | Horng et al. |
| 2004/0219959 A1 | 11/2004 | Khayrallah et al. |
| 2004/0224643 A1 | 11/2004 | Nakai |
| 2004/0253955 A1 | 12/2004 | Love et al. |
| 2004/0266356 A1 | 12/2004 | Javor et al. |
| 2005/0039060 A1 | 2/2005 | Okayasu |
| 2005/0075077 A1 | 4/2005 | Mach et al. |
| 2005/0079847 A1 | 4/2005 | Arafa |
| 2005/0118977 A1 | 6/2005 | Drogi et al. |
| 2005/0197090 A1 | 9/2005 | Stockstad et al. |
| 2005/0215264 A1 | 9/2005 | Subramaniam et al. |

(56) References Cited

U.S. PATENT DOCUMENTS

| | | | |
|---|---|---|---|
| 2005/0265084 A1 | 12/2005 | Choi | |
| 2005/0277387 A1 | 12/2005 | Kojima et al. | |
| 2006/0009177 A1 | 1/2006 | Persico et al. | |
| 2006/0023745 A1* | 2/2006 | Koo et al. | 370/468 |
| 2006/0061773 A1 | 3/2006 | Lee et al. | |
| 2006/0121937 A1 | 6/2006 | Son | |
| 2006/0128322 A1 | 6/2006 | Igarashi et al. | |
| 2006/0146693 A1 | 7/2006 | Mori et al. | |
| 2006/0189286 A1 | 8/2006 | Kyu et al. | |
| 2006/0222100 A1 | 10/2006 | Behzad | |
| 2006/0234662 A1 | 10/2006 | Diloisy | |
| 2006/0291428 A1 | 12/2006 | Filipovic | |
| 2007/0049332 A1 | 3/2007 | Higuchi | |
| 2007/0060080 A1 | 3/2007 | Nishimura et al. | |
| 2007/0072577 A1 | 3/2007 | Rozenblit et al. | |
| 2007/0105517 A1 | 5/2007 | Chang et al. | |
| 2007/0142013 A1 | 6/2007 | Bucknor et al. | |
| 2007/0177656 A1 | 8/2007 | Maruta et al. | |
| 2007/0177693 A1 | 8/2007 | Kluge | |
| 2007/0184801 A1 | 8/2007 | Kogawa et al. | |
| 2007/0197170 A1 | 8/2007 | Boos | |
| 2007/0197178 A1 | 8/2007 | Gu | |
| 2007/0197204 A1 | 8/2007 | Herczog et al. | |
| 2007/0202890 A1 | 8/2007 | Feher | |
| 2007/0242784 A1 | 10/2007 | Sampson et al. | |
| 2007/0243832 A1 | 10/2007 | Park et al. | |
| 2007/0262817 A1 | 11/2007 | Ciccarelli et al. | |
| 2007/0262871 A1 | 11/2007 | Yamagajo et al. | |
| 2008/0004078 A1 | 1/2008 | Barratt et al. | |
| 2008/0013654 A1 | 1/2008 | Rick et al. | |
| 2008/0117999 A1 | 5/2008 | Kadous et al. | |
| 2008/0139151 A1 | 6/2008 | Ojo et al. | |
| 2008/0204148 A1 | 8/2008 | Kim et al. | |
| 2008/0224770 A1 | 9/2008 | Kim et al. | |
| 2008/0224791 A1 | 9/2008 | Cheng | |
| 2008/0225971 A1 | 9/2008 | Behzad | |
| 2008/0261650 A1 | 10/2008 | Piriyapoksombut et al. | |
| 2008/0268785 A1* | 10/2008 | McCoy | H04B 7/0417 455/67.11 |
| 2009/0124227 A1 | 5/2009 | Ishiguro | |
| 2009/0227214 A1 | 9/2009 | Georgantas et al. | |
| 2009/0237161 A1 | 9/2009 | Fagg | |
| 2009/0243869 A1 | 10/2009 | Sanderford, Jr. | |
| 2009/0253456 A1 | 10/2009 | Toh et al. | |
| 2009/0290659 A1 | 11/2009 | Petrovic et al. | |
| 2009/0323779 A1 | 12/2009 | Lennen | |
| 2010/0019970 A1 | 1/2010 | Farrokhi et al. | |
| 2010/0034094 A1 | 2/2010 | Tenny | |
| 2010/0040178 A1 | 2/2010 | Sutton et al. | |
| 2010/0142440 A1 | 6/2010 | Inoue | |
| 2010/0195754 A1 | 8/2010 | Li et al. | |
| 2010/0197263 A1 | 8/2010 | Dwyer et al. | |
| 2010/0210226 A1 | 8/2010 | Matsuyama | |
| 2010/0210272 A1 | 8/2010 | Sundstrom et al. | |
| 2010/0210299 A1 | 8/2010 | Gorbachov | |
| 2010/0214184 A1 | 8/2010 | Tran et al. | |
| 2010/0225414 A1 | 9/2010 | Gorbachov | |
| 2010/0226327 A1 | 9/2010 | Zhang et al. | |
| 2010/0232493 A1 | 9/2010 | Thirumoorthy | |
| 2010/0237947 A1 | 9/2010 | Xiong et al. | |
| 2010/0253435 A1 | 10/2010 | Ichitsubo et al. | |
| 2010/0265875 A1 | 10/2010 | Zhao et al. | |
| 2010/0271986 A1 | 10/2010 | Chen | |
| 2010/0272051 A1 | 10/2010 | Fu et al. | |
| 2010/0301946 A1 | 12/2010 | Borremans | |
| 2010/0311378 A1 | 12/2010 | Tasic et al. | |
| 2010/0328155 A1 | 12/2010 | Simic et al. | |
| 2010/0330977 A1 | 12/2010 | Kadous et al. | |
| 2011/0018635 A1 | 1/2011 | Tasic et al. | |
| 2011/0044380 A1 | 2/2011 | Marra et al. | |
| 2011/0050319 A1 | 3/2011 | Wong | |
| 2011/0084791 A1 | 4/2011 | Mun et al. | |
| 2011/0086603 A1 | 4/2011 | Toosi et al. | |
| 2011/0105059 A1* | 5/2011 | Gaal | H04W 52/146 455/127.1 |
| 2011/0110463 A1 | 5/2011 | Chang et al. | |
| 2011/0122972 A1 | 5/2011 | Lie et al. | |
| 2011/0165848 A1 | 7/2011 | Gorbachov et al. | |
| 2011/0193625 A1 | 8/2011 | Gatta et al. | |
| 2011/0194504 A1* | 8/2011 | Gorokhov et al. | 370/329 |
| 2011/0204973 A1 | 8/2011 | Hu et al. | |
| 2011/0211533 A1 | 9/2011 | Casaccia et al. | |
| 2011/0217945 A1 | 9/2011 | Uehara et al. | |
| 2011/0222443 A1 | 9/2011 | Khlat | |
| 2011/0222444 A1 | 9/2011 | Khlat et al. | |
| 2011/0242999 A1 | 10/2011 | Palanki et al. | |
| 2011/0250926 A1 | 10/2011 | Wietfeldt et al. | |
| 2011/0268048 A1 | 11/2011 | Toskala et al. | |
| 2011/0268232 A1 | 11/2011 | Park et al. | |
| 2011/0292844 A1 | 12/2011 | Kwun et al. | |
| 2011/0299434 A1 | 12/2011 | Gudem et al. | |
| 2011/0300810 A1 | 12/2011 | Mikhemar et al. | |
| 2012/0009886 A1 | 1/2012 | Poulin | |
| 2012/0013387 A1 | 1/2012 | Sankaranarayanan et al. | |
| 2012/0026862 A1 | 2/2012 | Sadri et al. | |
| 2012/0044927 A1 | 2/2012 | Pan et al. | |
| 2012/0056681 A1 | 3/2012 | Lee | |
| 2012/0057621 A1 | 3/2012 | Hong et al. | |
| 2012/0099542 A1* | 4/2012 | Yuk | H04L 5/0007 370/329 |
| 2012/0195237 A1 | 8/2012 | Chan et al. | |
| 2012/0236829 A1 | 9/2012 | Takano et al. | |
| 2012/0243455 A1* | 9/2012 | Feng | H04L 5/0037 370/311 |
| 2012/0250612 A1* | 10/2012 | Jalloul | H04B 7/0805 370/328 |
| 2012/0293265 A1 | 11/2012 | Heikkinen et al. | |
| 2012/0294299 A1 | 11/2012 | Fernando | |
| 2012/0307739 A1* | 12/2012 | Ishihara | H04B 7/0874 370/328 |
| 2012/0327825 A1 | 12/2012 | Gudem et al. | |
| 2012/0329395 A1 | 12/2012 | Husted et al. | |
| 2013/0003617 A1 | 1/2013 | Gudem et al. | |
| 2013/0003783 A1 | 1/2013 | Gudem et al. | |
| 2013/0043946 A1 | 2/2013 | Hadjichristos et al. | |
| 2013/0051284 A1 | 2/2013 | Khlat | |
| 2013/0114769 A1 | 5/2013 | Fernando | |
| 2013/0163492 A1* | 6/2013 | Wong | 370/311 |
| 2013/0217398 A1 | 8/2013 | Winiecki et al. | |
| 2013/0230080 A1 | 9/2013 | Gudem et al. | |
| 2013/0231064 A1 | 9/2013 | Gudem et al. | |
| 2013/0265892 A1 | 10/2013 | Fernando | |
| 2013/0315348 A1 | 11/2013 | Tasic et al. | |
| 2013/0316668 A1 | 11/2013 | Davierwalla et al. | |
| 2013/0316669 A1 | 11/2013 | Davierwalla et al. | |
| 2013/0316670 A1 | 11/2013 | Tasic et al. | |
| 2014/0072001 A1 | 3/2014 | Chang et al. | |
| 2014/0113578 A1 | 4/2014 | Xu | |

FOREIGN PATENT DOCUMENTS

| | | |
|---|---|---|
| CN | 101228702 A | 7/2008 |
| CN | 101242158 A | 8/2008 |
| CN | 101523967 A | 9/2009 |
| CN | 101789805 A | 7/2010 |
| CN | 102098784 A | 6/2011 |
| EP | 1164719 A1 | 12/2001 |
| EP | 1370012 | 12/2003 |
| EP | 1398887 A1 | 3/2004 |
| EP | 1708372 A2 | 10/2006 |
| EP | 1726098 A1 | 11/2006 |
| EP | 1748567 A2 | 1/2007 |
| EP | 1761076 A2 | 3/2007 |
| EP | 2068583 A1 | 6/2009 |
| EP | 2141818 A1 | 1/2010 |
| EP | 1916767 B1 | 12/2010 |
| EP | 2393205 A2 | 12/2011 |
| EP | 2398285 A1 | 12/2011 |
| GB | 2472978 A | 3/2011 |
| JP | 05227234 | 9/1993 |
| JP | H0730452 A | 1/1995 |
| JP | 07221684 | 8/1995 |
| JP | 9027778 A | 1/1997 |

(56) References Cited

FOREIGN PATENT DOCUMENTS

| | | |
|---|---|---|
| JP | 09116458 | 5/1997 |
| JP | H11127300 A | 5/1999 |
| JP | 2000013278 A | 1/2000 |
| JP | 2001285114 | 10/2001 |
| JP | 2002261880 A | 9/2002 |
| JP | 2004015162 A | 1/2004 |
| JP | 2006520143 A | 8/2006 |
| JP | 2007324711 A | 12/2007 |
| JP | 2008085793 A | 4/2008 |
| JP | 2008519535 A | 6/2008 |
| JP | 2009027778 | 2/2009 |
| JP | 2009130867 A | 6/2009 |
| JP | 2011015112 A | 1/2011 |
| JP | 2011082669 A | 4/2011 |
| JP | 2011091747 A | 5/2011 |
| JP | 2011119807 A | 6/2011 |
| WO | 01050636 | 7/2001 |
| WO | 2002037686 | 5/2002 |
| WO | 05039060 | 4/2005 |
| WO | 2005062477 A2 | 7/2005 |
| WO | 2005064816 A1 | 7/2005 |
| WO | 2005088847 A1 | 9/2005 |
| WO | 2005104389 A1 | 11/2005 |
| WO | 2005104390 A1 | 11/2005 |
| WO | 2006050515 A2 | 5/2006 |
| WO | 2006118538 A2 | 11/2006 |
| WO | 2008059257 A1 | 5/2008 |
| WO | 2008084539 A1 | 7/2008 |
| WO | 08103757 | 8/2008 |
| WO | 2008092745 A1 | 8/2008 |
| WO | 2008145604 A1 | 12/2008 |
| WO | 2010059257 A1 | 5/2010 |
| WO | 2010141908 | 12/2010 |
| WO | 2010151847 A1 | 12/2010 |
| WO | 2011019850 A1 | 2/2011 |
| WO | 2011050729 A1 | 5/2011 |
| WO | 2011092005 A1 | 8/2011 |
| WO | 2011138697 A1 | 11/2011 |
| WO | 2012008705 A2 | 1/2012 |
| WO | 2012049529 A1 | 4/2012 |
| WO | 2012158976 A1 | 11/2012 |
| WO | 2013036794 A1 | 3/2013 |
| WO | 2013131047 | 9/2013 |

OTHER PUBLICATIONS

Philips: "Capabilities of multi-transceiver UES", 3GPP Draft; R1-103913, 3rd Generation Partnership Project (3GPP), Mobile Competence Centre; 650, Route Des Lucioles; F-06921 Sophia-Antipolis Cedex; France, vol. RAN WG1, No. Dresden, Germany; Jun. 28, 2010, Jun. 22, 2010 (Jun. 22, 2010), XP050449298, [retrieved on Jun. 22, 2010] the whole document.
3GPP TS 36.101 V11.0.0, 3rd Generation Partnership Project; Technical Specification Group Radio Access Network; Evolved Universal Terrestrial Radio Access (E-UTRA); User Equipment (UE) radio transmission and reception (Release 11), Mar. 2012.
Aparin et al., "A Highly-integrated tri-band/quad-mode SiGe BiCMOS RF-to-baseband and receiver for wireless CDMA/WCDMA/AMPS applications with GPS capability", Solid-State Circuits Conference, 2002. Digest of Technical Papers. 2002 IEEE International Feb. 3-7, 2002, Piscataway, NJ, USA, IEEE, vol. 1, 2002, pp. 234-235, XP010585547, ISBN: 0-7803-7335-9.
Broyde F., et al., "The Noise Performance of aMultiple-Input-Port and Multiple-Output-Port Low-Noise Amplifier Connected to an Array of Coupled Antennas," International Journal of Antennas and Propagation, vol. 2011, Article ID 438478, Jul. 18, 2011, 12 pages.
Chen, et al, "A 5-6 GHz 1-V CMOS Direct-Conversion Receiver With an Integrated Quadrature Coupler," IEEE Journal of Solid-State Circuits, vol. 42, No. 9, 2007, pp. 1963-1975.
Chen, et al., "A monolithic 5.9-GHz CMOS I/Q direct-down converter utilizing a quadrature coupler and transformer-coupled subharmonic mixers," Microwave and Wireless Components Letters, IEEE, vol. 16, No. 4, 2006, pp. 197-199.
Garuda, et al., "A Multi-band CMOS RF Front-end for 4G WiMAX and WLAN Applications," 2006 IEEE International Symposium on Circuits and Systes, 2006. ISCAS 2006. May 2006, 4 pages.
Hashemi, et al., "Concurrent Multiband Low-Noise Amplifiers—Theory, Design, and Applications," IEEE Transactions on Microwave Theory and Techniques, vol. 50, No. 1, Jan. 2002.
Henrik M et al., "A Full Duplex Front End Module for WiFi 802.11.n Applications", European Microwave Association, vol. 12, No. 4, Oct. 2008, pp. 162-165.
Hwang, et al., "A High IIP2 Direct-Conversion Receiver using Even-Harmonic Reduction Technique for Cellular CDMA/PCS/GPS applications," IEEE Transaction on Circuits and Systems.
Jones W. W., et al., "Narrowband interference suppression using filter-bank analysis/synthesis techniques", Military Communications Conference, 1992. MILC0M '92, Conference REC0R D. Communications—Fusing Command, Control and Intelligence., IEEE San Diego, CA, USA, Oct. 11 14, 1992, New York, NY, USA, IEEE, US, Oct. 11, 1992 (Oct. 11, 1992), pp. 898-902, XP010060840, DOI: 10.1109/MILCOM.1992.243977, ISBN: 978-0-7803-0585-4.
Jussi R et al., "A Dual-Band RF Front-End for WCDMA and GSM Applications", IEEE, Journal Solid-State Circuits, 2001, vol. 36, No. 8, pp. 1198-1204.
Kevin W et al., "3G/4G Multimode Cellular Front End Challenges", Part 2: Architecture Discussion, RFMD® White Paper, 9 pages.
Kim, T.W., et al., Highly Linear Receiver Front-End Adopting MOSFET Transconductance Linearization by Multiple Gated Transistors, IEEE Journal of Solid-State Circuits, United States, IEEE, Jan. 1, 2004, vol. 39, No. 1, pp. 223-229.
Lai, C.M.,et al., "Compact router transceiver architecture for carrier aggregation systems", Microwave Conference (EUMC), 2011 41st European, IEEE, Oct. 10, 2011 (Oct. 10, 2011), pp. 693-696, XP032072825, ISBN: 978-1-61284-235-6 the whole document.
Lee et al., "Development of Miniature Quad SAW filter bank based on PCB substrate", IEEE Intl Frequency Control Symp, pp. 146-149, 2007.
MSM6000 Chipset Solution, Qualcomm Incorporated.
MSM6500 Chipset Solution, Qualcomm Incorporated.
Pitschi M. et al., "High Performance Microwave Acoustic Components for Mobile Radios", Ultrasonics Symposium (IUS), 2009 IEEE International, EPCOS AG, Munich, Germany, vol. 1, Sep. 20-23, 2009.
Qualcomm Europe: "UE Implementation Impact due to 4C-HSDPA Operation", 3GPP Draft; R1-094067_UE_IMPL_IMPACT_4C_HSDPA, 3rd Generation Partnership Project (3GPP), Mobile Competence Centre ; 650, Route Des Lucioles ; F-06921 Sophia-Antipolis Cedex ; France, No. Miyazaki; Oct. 12, 2009, Oct. 12, 2009 (Oct. 12, 2009), XP050388547, [retrieved on Oct. 6, 2009].
Rahn D.G., et al., "A fully integrated multiband MIMO WLAN transceiver RFIC," IEEE J. Solid-State Circuits, 2005, vol. 40 (8), 1629-1641.
Sever et al. "A Dual-Antenna Phase-Array Ultra-Wideband CMOS Transceiver". IEEE Communications Magazine [Online] 2006, vol. 44, Issue 8, pp. 102-110. See pp. 104-107.
Tasic A. et al., "Design of Adaptive Multimode RF Front-End Circuits", IEEE Journal of Solid-State Circuits, vol. 42, Issue 2, Feb. 2007 pp. 313-322.
"UMTS Picocell Front End Module", CTS Corp. 8 pages.
Winternitz, et al., "A GPS Receiver for High-Altitude Satellite Navigation," IEEE Journal of Selected Topics in Signal Processing, vol. 3, No. 4, pp. 541-556, Aug. 2009.

\* cited by examiner

DYNAMIC UE SCHEDULING WITH SHARED ANTENNA AND CARRIER AGGREGATION

CROSS REFERENCE TO RELATED APPLICATION

This application is related to U.S. patent application Ser. No. 13/411,467, filed Mar. 2, 2012, in the names of GUDEM et al., the disclosure of which is expressly incorporated by reference in its entirety. This application claims the benefit under 35 U.S.C. §119(e) to U.S. Provisional Patent Application No. 61/658,870, entitled, DYNAMIC UE SCHEDULING WITH SHARED ANTENNA AND CARRIER AGGREGATION, filed on Jun. 12, 2012, in the names of KADOUS, et al., the disclosure of which is expressly incorporated by reference herein in its entirety.

BACKGROUND

Field

Aspects of the present disclosure relate generally to wireless communication systems, and more particularly to dynamic user equipment scheduling with shared antennas and carrier aggregation in long term evolution.

Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency divisional multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example of an emerging telecommunication standard is Long Term Evolution (LTE). LTE is a set of enhancements to the Universal Mobile Telecommunications System (UMTS) mobile standard promulgated by Third Generation Partnership Project (3GPP). It is designed to better support mobile broadband Internet access by improving spectral efficiency, lower costs, improve services, make use of new spectrum, and better integrate with other open standards using OFDMA on the downlink (DL), SC-FDMA on the uplink (UL), and multiple-input multiple-output (MIMO) antenna technology. However, as the demand for mobile broadband access continues to increase, there exists a need for further improvements in LTE technology. Preferably, these improvements should be applicable to other multi-access technologies and the telecommunication standards that employ these technologies.

SUMMARY

According to one aspect of the present disclosure, a method for wireless communication includes dynamically generating an indication of a user equipment antenna capability during a communication connection. The method may also include sending the indication to a base station.

According to another aspect of the present disclosure, an apparatus for wireless communication includes means for dynamically generating an indication of a user equipment antenna capability during a communication connection. The apparatus may also include means for sending the indication to a base station.

According to one aspect of the present disclosure, a computer program product for wireless communication in a wireless network includes a computer readable medium having non-transitory program code recorded thereon. The program code includes program code to dynamically generate an indication of a user equipment antenna capability during a communication connection. The program code also includes program code to send the indication to a base station.

According to one aspect of the present disclosure, an apparatus for wireless communication includes a memory and a processor(s) coupled to the memory. The processor(s) is configured to dynamically generate an indication of a user equipment antenna capability during a communication connection. The processor(s) is further configured to send the indication to a base station.

According to one aspect of the present disclosure, a method for wireless communication includes receiving an indication of a user equipment antenna capability during a communication connection. The method may also include scheduling the user equipment across one or more carriers based at least in part on the indication.

According to another aspect of the present disclosure, an apparatus for wireless communication includes means for receiving an indication of a user equipment antenna capability during a communication connection. The apparatus may also include means for scheduling the user equipment across one or more carriers based at least in part on the indication.

According to one aspect of the present disclosure, a computer program product for wireless communication in a wireless network includes a computer readable medium having non-transitory program code recorded thereon. The program code includes program code to receive an indication of a user equipment antenna capability during a communication connection. The program code also includes program code to schedule the user equipment across one or more carriers based at least in part on the indication.

According to one aspect of the present disclosure, an apparatus for wireless communication includes a memory and a processor(s) coupled to the memory. The processor(s) is configured to receive an indication of a user equipment antenna capability during a communication connection. The processor(s) is further configured to schedule the user equipment across one or more carriers based at least in part on the indication.

Additional features and advantages of the disclosure will be described below. It should be appreciated by those skilled in the art that this disclosure may be readily utilized as a basis for modifying or designing other structures for carrying out the same purposes of the present disclosure. It should also be realized by those skilled in the art that such equivalent constructions do not depart from the teachings of the disclosure as set forth in the appended claims. The novel features, which are believed to be characteristic of the disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout.

DETAILED DESCRIPTION

Figure 1:
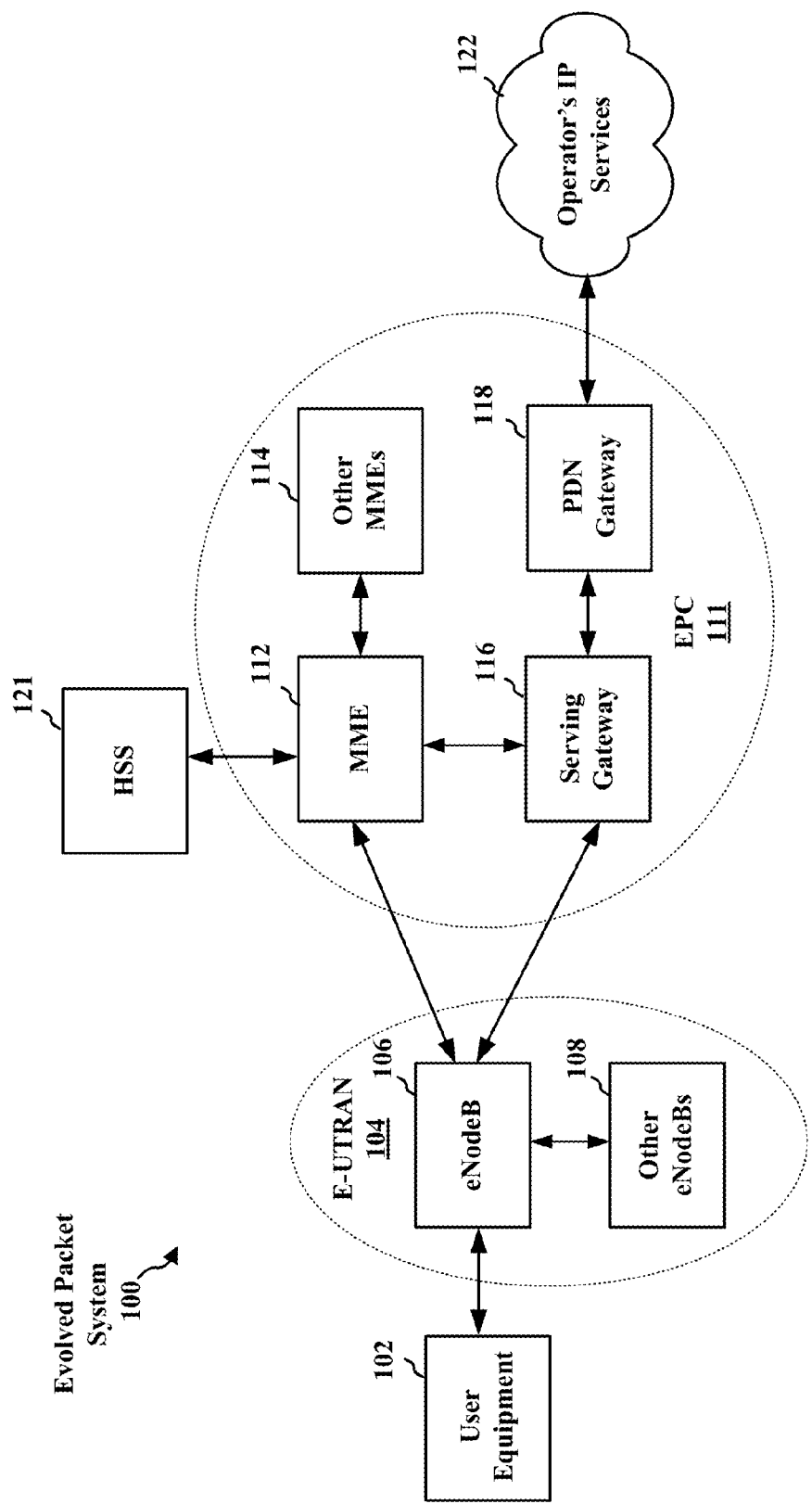
FIG. 1 is a diagram illustrating an example of a network architecture.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

Aspects of the telecommunication systems are presented with reference to various apparatus and methods. These apparatus and methods are described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more exemplary embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

FIG. 1 is a diagram illustrating an LTE network architecture 100. The LTE network architecture 100 may be referred to as an Evolved Packet System (EPS) 100. The EPS 100 may include one or more user equipment (UE) 102, an Evolved UMTS Terrestrial Radio Access Network (E-UTRAN) 104, an Evolved Packet Core (EPC) 111, a Home Subscriber Server (HSS) 121, and an Operator's IP Services 122. The EPS can interconnect with other access networks, but for simplicity those entities/interfaces are not shown. As shown, the EPS provides packet-switched services, however, as those skilled in the art will readily appreciate, the various concepts presented throughout this disclosure may be extended to networks providing circuit-switched services.

The E-UTRAN includes the evolved Node B (eNodeB) 106 and other eNodeBs 108. The eNodeB 106 provides user and control plane protocol terminations toward the UE 102. The eNodeB 106 may be connected to the other eNodeBs 108 via an X2 interface (e.g., backhaul). The eNodeB 106 may also be referred to as a base station, a base transceiver station, a radio base station, a radio transceiver, a transceiver function, a basic service set (BSS), an extended service set (ESS), or some other suitable terminology. The eNodeB 106 provides an access point to the EPC 111 for a UE 102. Examples of UEs 102 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, or any other similar functioning device. The UE 102 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

The eNodeB 106 is connected by an S1 interface to the EPC 111. The EPC 111 includes a Mobility Management Entity (MME) 112, other MMEs 114, a Serving Gateway 116, and a Packet Data Network (PDN) Gateway 118. The MME 112 is the control node that processes the signaling between the UE 102 and the EPC 111. Generally, the MME 112 provides bearer and connection management. All user IP packets are transferred through the Serving Gateway 116, which itself is connected to the PDN Gateway 118. The PDN Gateway 118 provides UE IP address allocation as well as other functions. The PDN Gateway 118 is connected to the Operator's IP Services 122. The Operator's IP Services 122 may include the Internet, the Intranet, an IP Multimedia Subsystem (IMS), and a PS Streaming Service (PSS).

Figure 2:
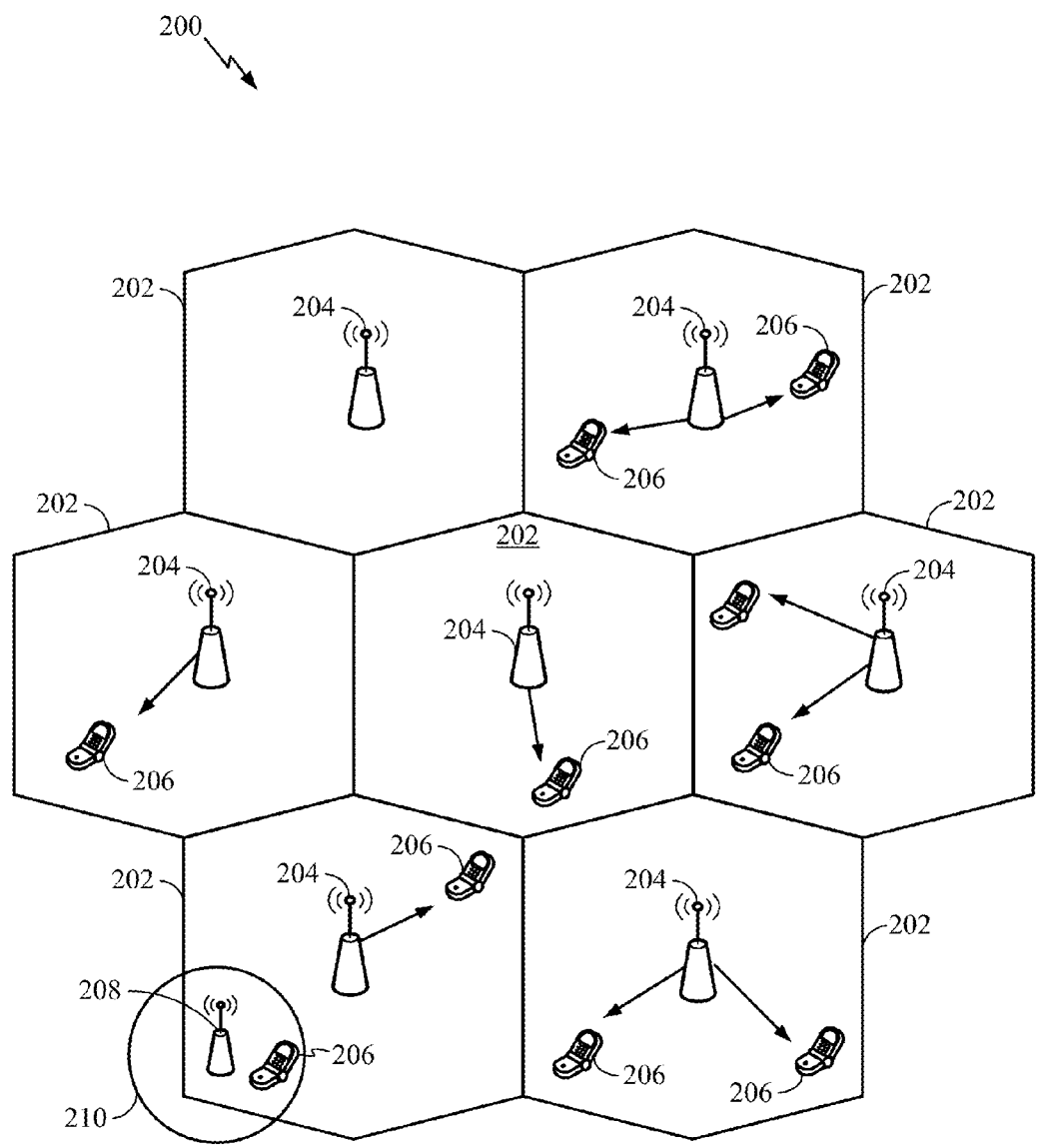
FIG. 2 is a diagram illustrating an example of an access network.

FIG. 2 is a diagram illustrating an example of an access network 200 in an LTE network architecture. In this example, the access network 200 is divided into a number of cellular regions (cells) 202. One or more lower power class eNodeBs 208 may have cellular regions 210 that overlap with one or more of the cells 202. A lower power class eNodeB 208 may be referred to as a remote radio head (RRH). The lower power class eNodeB 208 may be a femto cell (e.g., home eNodeB (HeNodeB)), pico cell, or micro cell. The macro eNodeBs 204 are each assigned to a respective cell 202 and are configured to provide an access point to the EPC 111 for all the UEs 206 in the cells 202. There is no centralized controller in this example of an access network 200, but a centralized controller may be used in alternative configurations. The eNodeBs 204 are responsible for all radio related functions including radio bearer control, admission control, mobility control, scheduling, security, and connectivity to the serving gateway 116.

The modulation and multiple access scheme employed by the access network 200 may vary depending on the particular telecommunications standard being deployed. In LTE applications, OFDM is used on the downlink and SC-FDMA is used on the uplink to support both frequency division duplexing (FDD) and time division duplexing (TDD). As those skilled in the art will readily appreciate from the detailed description to follow, the various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), Ultra Mobile Broadband (UMB), IEEE 802.11 (Wi-Fi), IEEE 802.16 (WiMAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The eNodeBs 204 may have multiple antennas supporting MIMO technology. The use of MIMO technology enables the eNodeBs 204 to exploit the spatial domain to support spatial multiplexing, beamforming, and transmit diversity. Spatial multiplexing may be used to transmit different streams of data simultaneously on the same frequency. The data steams may be transmitted to a single UE 206 to increase the data rate or to multiple UEs 206 to increase the overall system capacity. This is achieved by spatially precoding each data stream (i.e., applying a scaling of an amplitude and a phase) and then transmitting each spatially precoded stream through multiple transmit antennas on the downlink. The spatially precoded data streams arrive at the UE(s) 206 with different spatial signatures, which enables each of the UE(s) 206 to recover the one or more data streams destined for that UE 206. On the uplink, each UE 206 transmits a spatially precoded data stream, which enables the eNodeB 204 to identify the source of each spatially precoded data stream.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity.

In the detailed description that follows, various aspects of an access network will be described with reference to a MIMO system supporting OFDM on the downlink. OFDM is a spread-spectrum technique that modulates data over a number of subcarriers within an OFDM symbol. The subcarriers are spaced apart at precise frequencies. The spacing provides "orthogonality" that enables a receiver to recover the data from the subcarriers. In the time domain, a guard interval (e.g., cyclic prefix) may be added to each OFDM symbol to combat inter-OFDM-symbol interference. The uplink may use SC-FDMA in the form of a DFT-spread OFDM signal to compensate for high peak-to-average power ratio (PAPR).

Figure 3:
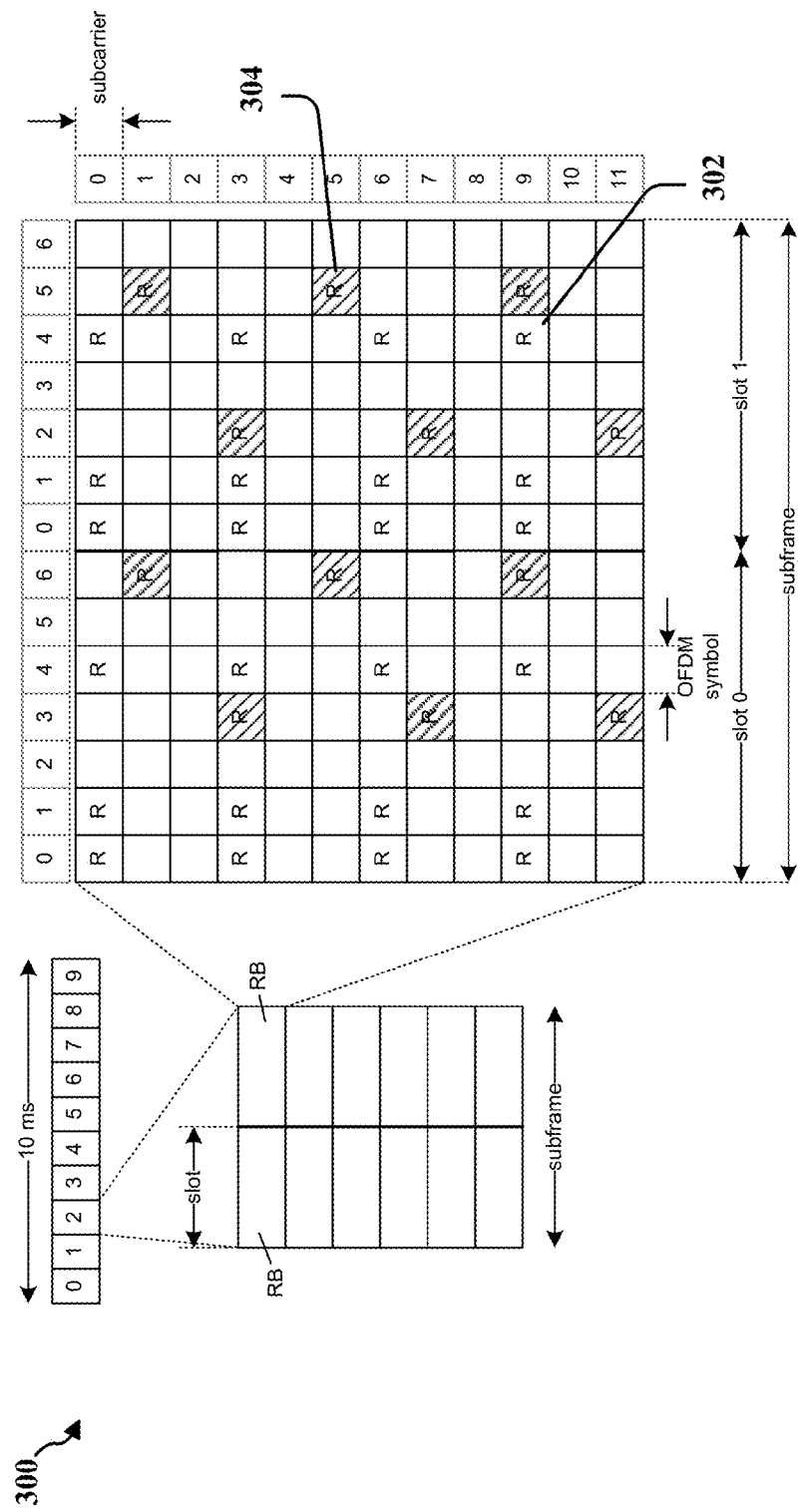
FIG. 3 is a diagram illustrating an example of a downlink frame structure in LTE.

FIG. 3 is a diagram 300 illustrating an example of a downlink frame structure in LTE. A frame (10 ms) may be divided into 10 equally sized sub-frames. Each sub-frame may include two consecutive time slots. A resource grid may be used to represent two time slots, each time slot including a resource block. The resource grid is divided into multiple resource elements. In LTE, a resource block contains 12 consecutive subcarriers in the frequency domain and, for a normal cyclic prefix in each OFDM symbol, 7 consecutive OFDM symbols in the time domain, or 84 resource elements. For an extended cyclic prefix, a resource block contains 6 consecutive OFDM symbols in the time domain and has 72 resource elements. Some of the resource elements, as indicated as R 302, 304, include downlink reference signals (DL-RS). The DL-RS include Cell-specific RS (CRS) (also sometimes called common RS) 302 and UE-specific RS (UE-RS) 304. UE-RS 304 are transmitted only on the resource blocks upon which the corresponding physical downlink shared channel (PDSCH) is mapped. The number of bits carried by each resource element depends on the modulation scheme. Thus, the more resource blocks that a UE receives and the higher the modulation scheme, the higher the data rate for the UE.

Figure 4:
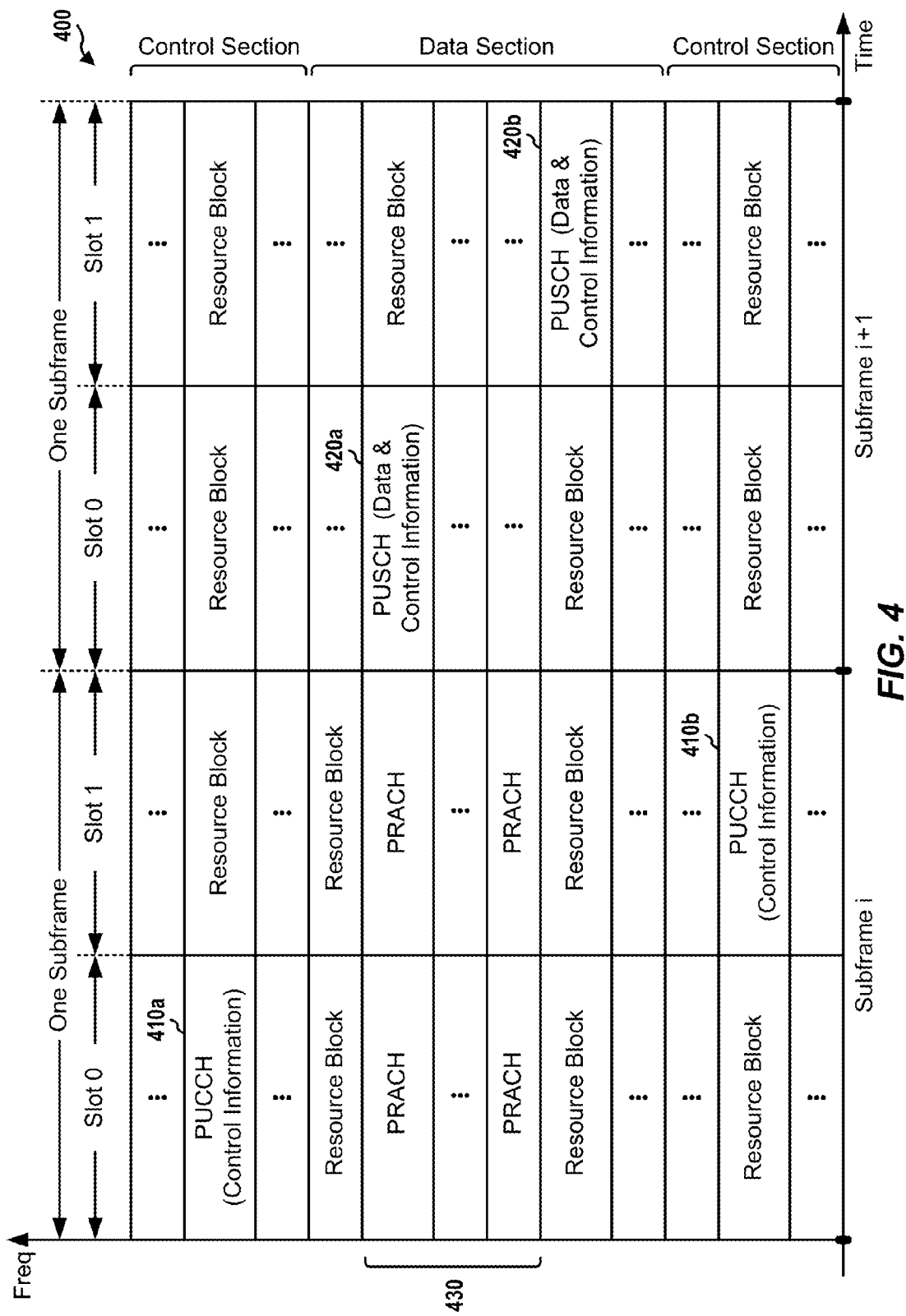
FIG. 4 is a diagram illustrating an example of an uplink frame structure in LTE.

FIG. 4 is a diagram 400 illustrating an example of an uplink frame structure in LTE. The available resource blocks for the uplink may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The uplink frame structure results in the data section including contiguous subcarriers, which may allow a single UE to be assigned all of the contiguous subcarriers in the data section.

A UE may be assigned resource blocks 410a, 410b in the control section to transmit control information to an eNodeB. The UE may also be assigned resource blocks 420a, 420b in the data section to transmit data to the eNodeB. The UE may transmit control information in a physical uplink control channel (PUCCH) on the assigned resource blocks in the control section. The UE may transmit only data or both data and control information in a physical uplink shared channel (PUSCH) on the assigned resource blocks in the data section. An uplink transmission may span both slots of a subframe and may hop across frequency.

A set of resource blocks may be used to perform initial system access and achieve uplink synchronization in a physical random access channel (PRACH) 430. The PRACH 430 carries a random sequence and cannot carry any uplink data/signaling. Each random access preamble occupies a bandwidth corresponding to six consecutive resource blocks. The starting frequency is specified by the network. That is, the transmission of the random access preamble is restricted to certain time and frequency resources. There is no frequency hopping for the PRACH. The PRACH attempt is carried in a single subframe (1 ms) or in a sequence of few contiguous subframes and a UE can make only a single PRACH attempt per frame (10 ms).

Figure 5:
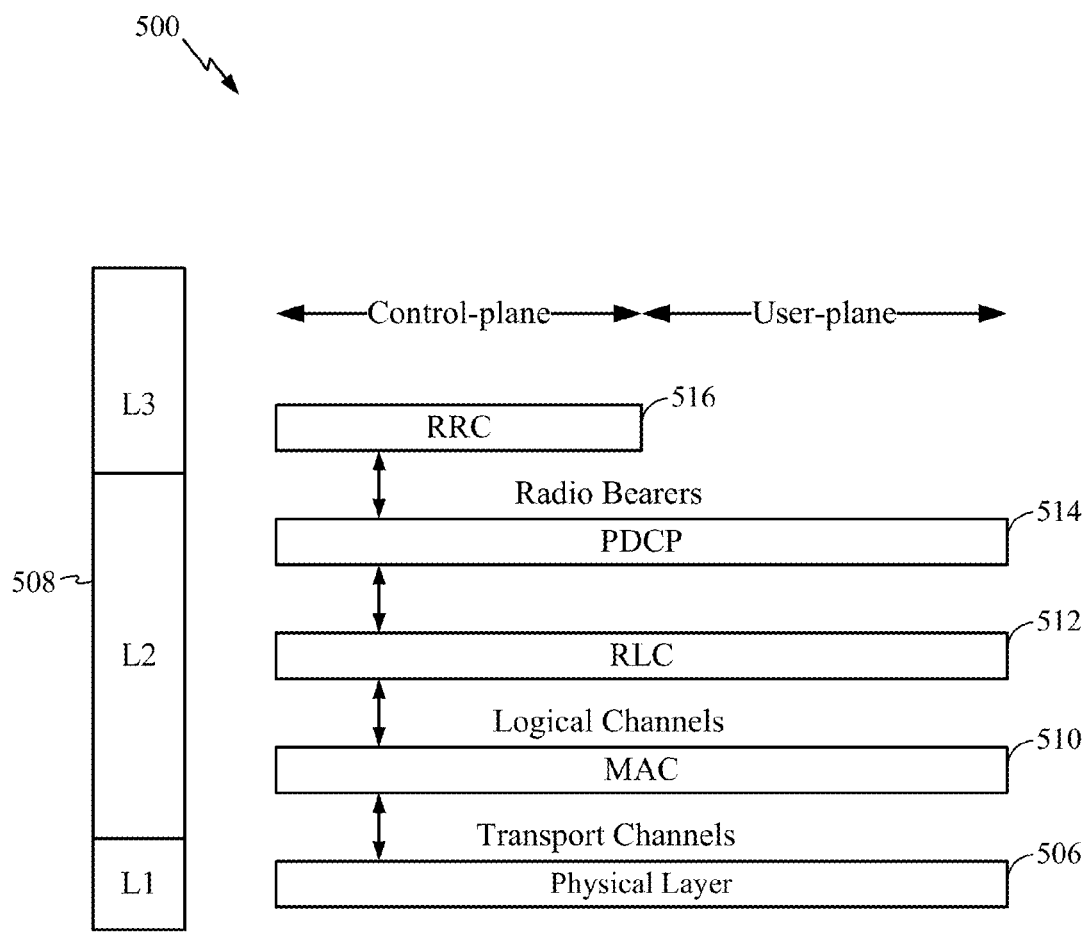
FIG. 5 is a diagram illustrating an example of a radio protocol architecture for the user and control plane.

FIG. 5 is a diagram 500 illustrating an example of a radio protocol architecture for the user and control planes in LTE. The radio protocol architecture for the UE and the eNodeB is shown with three layers: Layer 1, Layer 2, and Layer 3. Layer 1 (L1 layer) is the lowest layer and implements various physical layer signal processing functions. The L1 layer will be referred to herein as the physical layer 506. Layer 2 (L2 layer) 508 is above the physical layer 506 and is responsible for the link between the UE and eNodeB over the physical layer 506.

In the user plane, the L2 layer 508 includes a media access control (MAC) sublayer 510, a radio link control (RLC) sublayer 512, and a packet data convergence protocol (PDCP) 514 sublayer, which are terminated at the eNodeB on the network side. Although not shown, the UE may have several upper layers above the L2 layer 508 including a network layer (e.g., IP layer) that is terminated at the PDN gateway 118 on the network side, and an application layer that is terminated at the other end of the connection (e.g., far end UE, server, etc.).

The PDCP sublayer 514 provides multiplexing between different radio bearers and logical channels. The PDCP sublayer 514 also provides header compression for upper layer data packets to reduce radio transmission overhead, security by ciphering the data packets, and handover support for UEs between eNodeBs. The RLC sublayer 512 provides segmentation and reassembly of upper layer data packets, retransmission of lost data packets, and reordering of data packets to compensate for out-of-order reception due to hybrid automatic repeat request (HARQ). The MAC sublayer 510 provides multiplexing between logical and transport channels. The MAC sublayer 510 is also responsible for allocating the various radio resources (e.g., resource blocks) in one cell among the UEs. The MAC sublayer 510 is also responsible for HARQ operations.

In the control plane, the radio protocol architecture for the UE and eNodeB is substantially the same for the physical layer 506 and the L2 layer 508 with the exception that there is no header compression function for the control plane. The control plane also includes a radio resource control (RRC) sublayer 516 in Layer 3 (L3 layer). The RRC sublayer 516 is responsible for obtaining radio resources (i.e., radio bearers) and for configuring the lower layers using RRC signaling between the eNodeB and the UE.

Figure 6:
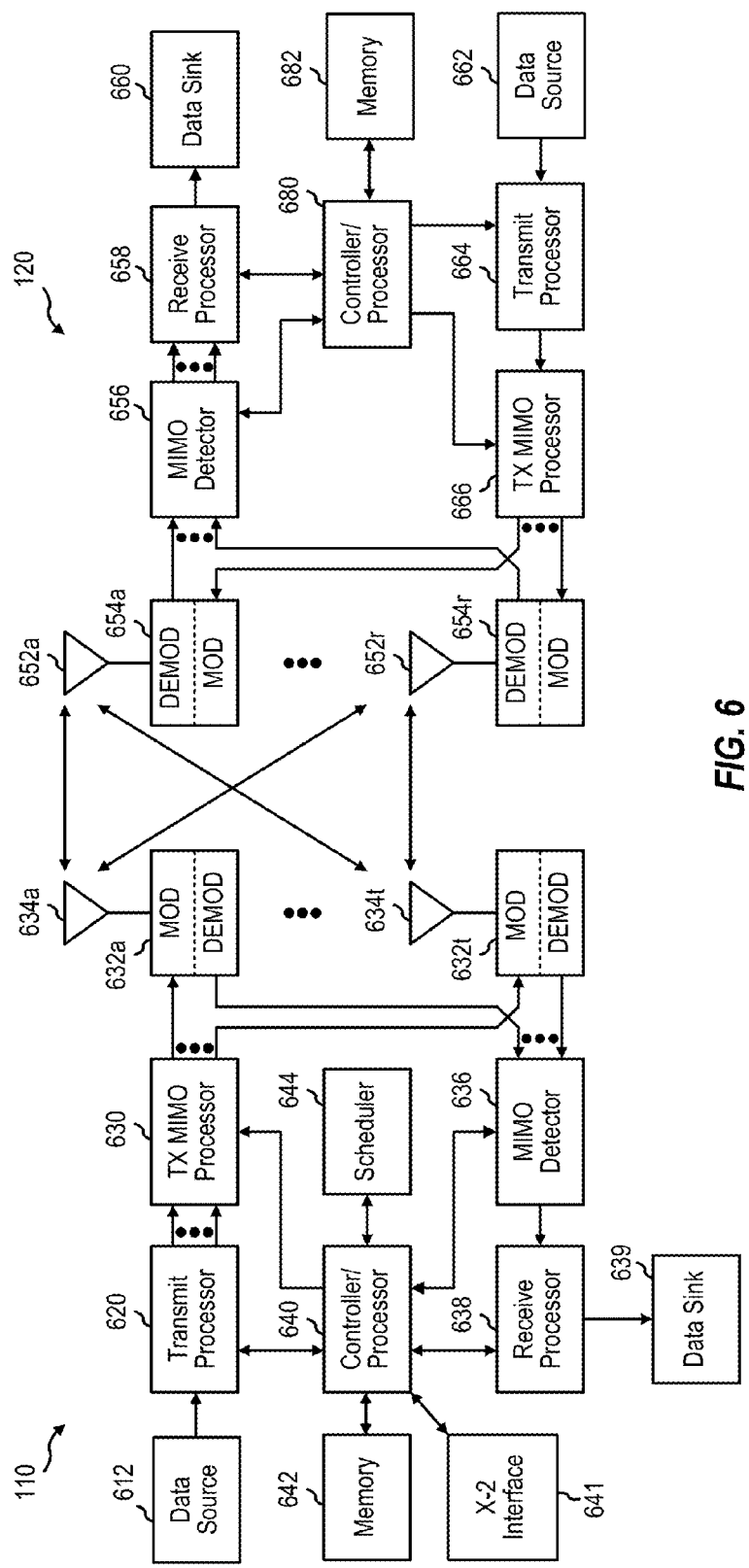
FIG. 6 is a diagram illustrating an example of an evolved Node B and user equipment in an access network.

FIG. 6 shows a block diagram of a design of a base station/eNodeB 110 and a UE 120, which may be one of the base stations/eNodeBs and one of the UEs in FIG. 1. For example, the base station 110 may be the macro eNodeB 110c in FIG. 1, and the UE 120 may be the UE 120y. The base station 110 may also be a base station of some other type. The base station 110 may be equipped with antennas 634a through 634t, and the UE 120 may be equipped with antennas 652a through 652r.

At the base station 110, a transmit processor 620 may receive data from a data source 612 and control information from a controller/processor 640. The control information may be for the PBCH, PCFICH, PHICH, PDCCH, etc. The data may be for the PDSCH, etc. The processor 620 may process (e.g., encode and symbol map) the data and control information to obtain data symbols and control symbols, respectively. The processor 620 may also generate reference symbols, e.g., for the PSS, SSS, and cell-specific reference signal. A transmit (TX) multiple-input multiple-output (MIMO) processor 630 may perform spatial processing (e.g., precoding) on the data symbols, the control symbols, and/or the reference symbols, if applicable, and may provide output symbol streams to the modulators (MODs) 632a through 632t. Each modulator 632 may process a respective output symbol stream (e.g., for OFDM, etc.) to obtain an output sample stream. Each modulator 632 may further process (e.g., convert to analog, amplify, filter, and upconvert) the output sample stream to obtain a downlink signal. Downlink signals from modulators 632a through 632t may be transmitted via the antennas 634a through 634t, respectively.

At the UE 120, the antennas 652a through 652r may receive the downlink signals from the base station 110 and may provide received signals to the demodulators (DEMODs) 654a through 654r, respectively. Each demodulator 654 may condition (e.g., filter, amplify, downconvert, and digitize) a respective received signal to obtain input samples. Each demodulator 654 may further process the input samples (e.g., for OFDM, etc.) to obtain received symbols. A MIMO detector 656 may obtain received symbols from all the demodulators 654a through 654r, perform MIMO detection on the received symbols if applicable, and provide detected symbols. A receive processor 658 may process (e.g., demodulate, deinterleave, and decode) the detected symbols, provide decoded data for the UE 120 to a data sink 660, and provide decoded control information to a controller/processor 680.

On the uplink, at the UE 120, a transmit processor 664 may receive and process data (e.g., for the PUSCH) from a data source 662 and control information (e.g., for the PUCCH) from the controller/processor 680. The processor 664 may also generate reference symbols for a reference signal. The symbols from the transmit processor 664 may be precoded by a TX MIMO processor 666 if applicable, further processed by the modulators 654a through 654r (e.g., for SC-FDM, etc.), and transmitted to the base station 110. At the base station 110, the uplink signals from the UE 120 may be received by the antennas 634, processed by the demodulators 632, detected by a MIMO detector 636 if applicable, and further processed by a receive processor 638 to obtain decoded data and control information sent by the UE 120. The processor 638 may provide the decoded data to a data sink 639 and the decoded control information to the controller/processor 640. The base station 110 can send messages to other base stations, for example, over an X2 interface 641.

The controllers/processors 640 and 680 may direct the operation at the base station 110 and the UE 120, respectively. The processor 640/680 and/or other processors and modules at the base station 110/UE 120 may perform or direct the execution of the functional blocks illustrated in FIG. 9, and/or other processes for the techniques described herein. The memories 642 and 682 may store data and program codes for the base station 110 and the UE 120, respectively. A scheduler 644 may schedule UEs for data transmission on the downlink and/or uplink.

LTE-Advanced UEs use spectrum in up to 20 MHz bandwidths allocated in a carrier aggregation of up to a total of 100 MHz (5 component carriers) used for transmission in each direction. Generally, less traffic is transmitted on the uplink than the downlink, so the uplink spectrum allocation may be smaller than the downlink allocation. For example, if 20 MHz is assigned to the uplink, the downlink may be assigned 100 MHz. These asymmetric FDD assignments will conserve spectrum and are a good fit for the typically asymmetric bandwidth utilization by broadband subscribers.

Figure 7A:
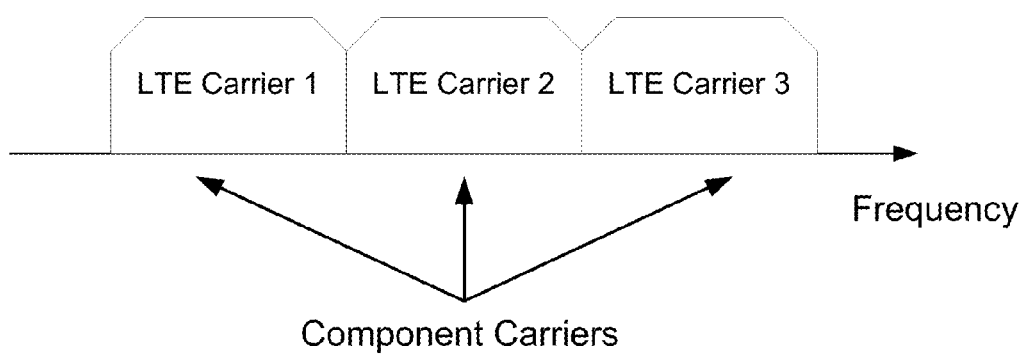
FIG. 7A discloses a continuous carrier aggregation type.
Figure 7B:
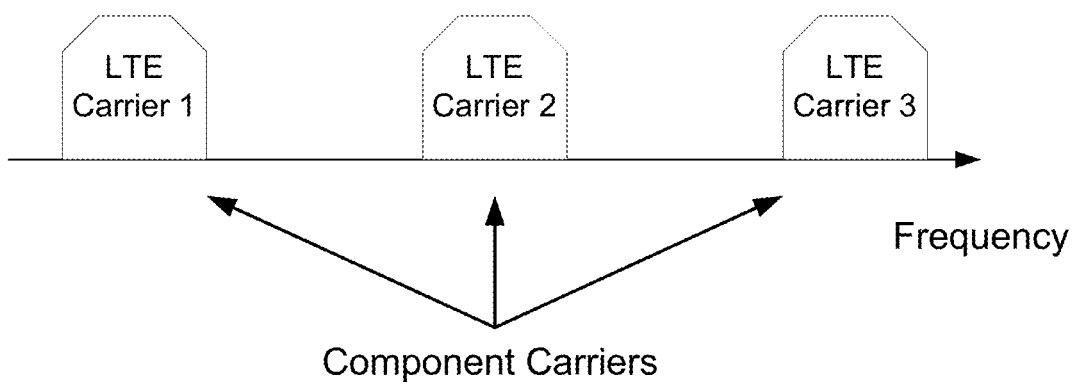
FIG. 7B discloses a non-continuous carrier aggregation type.

For the LTE-Advanced mobile systems, two types of carrier aggregation (CA) methods have been proposed, continuous CA and non-continuous CA. They are illustrated in FIGS. 7A and 7B. Non-continuous CA occurs when multiple available component carriers are separated along the frequency band (FIG. 7B). On the other hand, continuous CA occurs when multiple available component carriers are adjacent to each other (FIG. 7A). Both non-continuous and continuous CA aggregate multiple LTE/component carriers to serve a single unit of LTE Advanced UE.

Multiple RF receiving units and multiple FFTs may be deployed with non-continuous CA in LTE-Advanced UE since the carriers are separated along the frequency band. Because non-continuous CA supports data transmissions over multiple separated carriers across a large frequency range, propagation path loss, Doppler shift and other radio channel characteristics may vary a lot at different frequency bands.

Thus, to support broadband data transmission under the non-continuous CA approach, methods may be used to adaptively adjust coding, modulation and transmission power for different component carriers. For example, in an LTE-Advanced system where the enhanced NodeB (eNodeB) has fixed transmitting power on each component carrier, the effective coverage or supportable modulation and coding of each component carrier may be different.

Dynamic User Equipment Scheduling with Shared Antennas and Carrier Aggregation

A wireless communication device may include a number of radio access technologies (RATs) to support communication with different wireless networks. For example, the radio technologies may include a wide area network (e.g., third generation partnership project (3GPP) long term evolution (LTE) or 1x radio transmission technology (1X)), wireless local area network (WLAN), Bluetooth and/or the like. Multiple antennas and/or receivers/transmitters may be provided to facilitate multimode communication with various combinations of antenna and receiver/transmitter configurations. Each radio technology may transmit or receive signals via one or more antennas. The number of antennas on a wireless communication device (e.g., user equipment) may be limited due to space/cost constraints and coupling issues. As a result, it is desirable to support all radio technologies on the wireless communication device with a limited number of antennas such that desired performance may be achieved.

Figure 8:
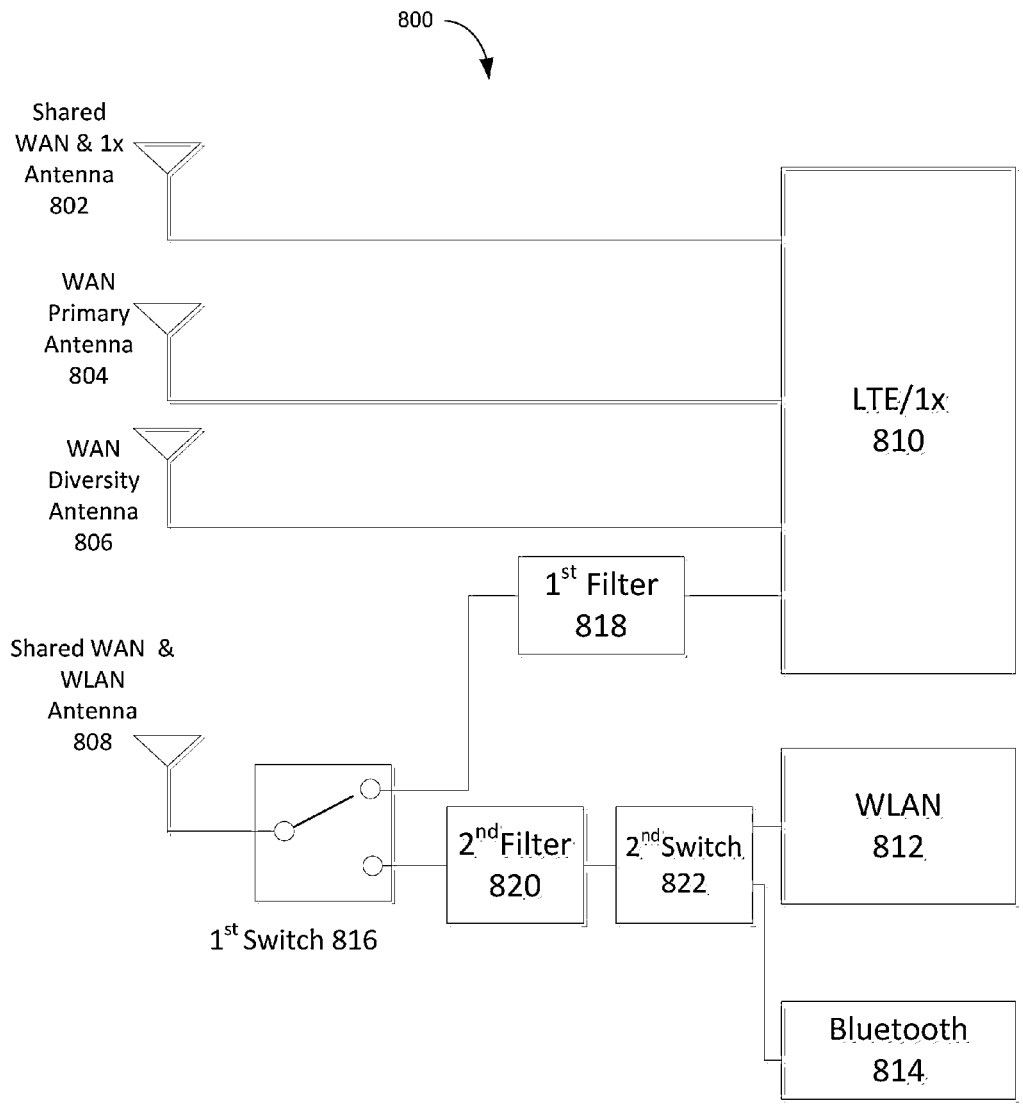
FIG. 8 illustrates a wireless communication device including multiple tunable antennas to facilitate multimode communication according to one aspect of the present disclosure.

FIG. 8 illustrates wireless communication device 800 including four tunable antennas to facilitate multimode communication that can support substantially all desired frequencies for a user equipment. The four tunable antennas include a first antenna 802, a second antenna 804, a third antenna 806 and a fourth antenna 808. The four tunable antennas may be assigned to one or more RATs depending on the use and performance metrics of the radio technology. In one configuration, the first antenna 802 is shared between a wide area network (WAN) technologies (for example, LTE or 1x), the second antenna 804 may be a primary antenna for the wide area network, the third antenna 806 may be a secondary or diversity antenna for a wide area network and the fourth antenna 808 may be shared between multiple RATs such as a wireless local area network (WLAN), Bluetooth or WAN.

A radio technology chip (e.g., a transceiver chips) 810 of the wireless communication device 800 may be coupled to the antennas 802, 804, 806 and 808. The radio technology chip 810 may be configured for WAN technology. A radio technology chip (e.g., a transceiver chips) 812 of the wireless communication device 800 may be coupled to the antenna 808 and may be configured for WLAN technology. A radio technology chip (e.g., a transceiver chip) 814 of the wireless communication device 800 may be coupled to the antenna 808 and may be configured for Bluetooth technology. The radio technology chips 812 and 814 may be integrated into a single chip. The configuration of the device 800, antennas 802, 804, 806, 808, and the radio technology chips 810, 812 and 814 supports a multiple-input and multiple-output (MIMO) carrier aggregation architecture.

The fourth antenna 808 may be coupled to a first switch 816. The first switch 816 may be coupled to a first filter 818 and a second filter 820. The first filter 818 may be coupled to the radio technology chip 810. When the antenna 808 is a WAN antenna, the first filter 818 may filter WAN signals before passing the signals to the radio technology chip 810. The second filter 820 may be coupled to the radio technology chip 812 and 814 via a second switch 822. The second switch 822 may have a single input and multiple outputs. In one configuration, the second switch 822 may have two outputs to the radio technology chips 812 and 814.

In some implementations, LTE may be configured with two antennas (e.g., primary and diversity antennas 804 and 806). In other implementations, LTE may be configured with three antennas or four antennas depending on the functions of other radio technologies sharing the antennas of a user equipment. As noted, the third and fourth antennas 802 and 808 can be shared with other radio technologies such as WAN, WLAN and Bluetooth.

LTE supports carrier aggregation where two downlink frequencies are received at the same time. Although user equipment may include up to four antennas, for LTE carrier aggregation mode two of the antennas are typically used in the implementation. The two antennas can be shared between two carrier frequencies associated with carrier aggregation mode. The carrier frequencies may be associated with four receive chains, with each carrier frequency supported by two receive chains. Therefore, a single antenna supports two receive chains on two carrier frequencies. For example, in the two antenna configuration, the primary antenna 804 is a primary antenna for a first carrier frequency and a second carrier frequency and the diversity antenna 806 is the diversity antenna for the first carrier frequency and the second carrier frequency. This configuration supports antenna diversity on both carrier frequencies, i.e., two antenna diversity on both carriers.

When two additional antennas, for example, are available to a user equipment 120, a four receiver MIMO mode on a single frequency may be implemented by tuning the antennas and radio frequency (RF) chains to a same frequency. Thus, a user equipment 120 having four tunable antennas may implement two different modes of operation, namely, carrier aggregation mode with two receive chains or four receiver MIMO mode on a single carrier frequency. Although only two modes of operation are described, other modes of operation may be implemented. For example, 2×3, i.e., three antennas and RF chains, on a primary carrier and 2×1, i.e., one antenna and RF chain, on a secondary carrier. Various features of the different modes of operation are described in U.S. patent application Ser. No. 13/411,467, filed Mar. 2, 2012, in the names of GUDEM et al., the disclosure of which is expressly incorporated by reference in its entirety.

One aspect of the present disclosure includes dynamically switching between multiple modes of operation for LTE. An eNodeB scheduler (e.g., scheduler 644) may schedule the user equipment 120 for data transmission on the downlink and/or uplink based on a selected mode of operation for LTE. Selecting a particular mode of operation from the multiple LTE modes may be advantageous because it can improve the overall system capacity. In some implementations, the system capacity improvement is achieved by specifying a single carrier MIMO mode instead of carrier aggregation mode. In one example, an eNodeB has two antennas and there are two user equipments (UEs) in the system where each UE is capable of implementing carrier aggregation mode with two receive chains or four receiver MIMO mode on a single carrier frequency. In the carrier aggregation mode, each UE is assigned half the bandwidth on the two carrier frequencies resulting in second order diversity. In the four receiver MIMO mode on a single carrier frequency, each UE is assigned the same total bandwidth and capability on the assigned bandwidth resulting in fourth order diversity. In this implementation, the total frequency resources assigned to each UE is the same. In this case, scheduling the two UEs on separate carriers achieves a capacity advantage over scheduling the two UEs according to carrier aggregation mode. However, in a single UE implementation, carrier aggregation is advantageous because of the increased bandwidth availability. When there is a mix of carrier aggregation mode only and carrier aggregation mode or four receiver MIMO mode on a single carrier frequency UEs, the second set of UEs may be scheduled according to a single carrier mode on one of the carriers.

Whether a four receiver MIMO mode on a single carrier frequency or carrier aggregation mode is implemented depends on the eNodeB scheduler's knowledge of the UE's antenna capability during a communication connection. For example, the eNodeB scheduler 644 may know which UEs have two antenna capability or four antenna capability. Conventionally, one or more UE antenna capability indications may be sent to the eNodeB scheduler 644 at the start of a communication session. For conventional implementation, further indications of UE capability are not used, as UE antenna capability did not conventionally change during a duration of a communication connection.

With antenna sharing, however, the UE antenna capability may change during the communication connection. In particular, antennas may be shared by different RATs dynamically during UE operation, resulting in switching of antennas between the different RATs. For example, at the start of a connection, a user equipment may only have a two antenna capability on a particular RAT (for example, LTE). Accordingly, the UE may indicate to the eNodeB scheduler 644 at the start of the connection that the UE may only implement a mode of two receiver diversity on two carriers or carrier aggregation mode. During the communication connection, however, two other antennas may become available to the UE for LTE communications. At this point, the antenna capability of the UE is changed to four receive antennas. Presently, the eNodeB would have no way of recognizing this change in the UE capability. It is desirable, therefore, to implement a method that provides an update of the UE antenna capability when an antenna becomes available or unavailable to the UE for a particular RAT after the start of the communication connection.

In one aspect of the present disclosure, a UE antenna capability may be updated during or after the start of the communication connection. This implementation includes dynamically sending an indication to a base station, such as an eNodeB, whenever the antenna capability of the UE changes after the start of the communication connection. In one aspect of the disclosure, the UE may dynamically indicate that it supports carrier aggregation mode with two receive chains or four receiver MIMO mode on a single carrier frequency during or after the start of the communication connection. Thus, the UEs indication of its antenna capability is dynamic and/or is subject to change throughout the duration of the communication connection.

In one aspect of the disclosure, a UE antenna capability may be updated during or after the start of the communication connection based on modified measurement reports. In this aspect, the user equipment may be configured to bias a base station, such as an eNodeB, toward scheduling a carrier aggregation mode with two receive chains or four receiver MIMO mode on a single carrier frequency. One method of implementing this feature is by modifying the channel quality indicator (CQI) reports of the UE. In the carrier aggregation mode, the UE sends CQI reports on both carriers. When additional antennas become available (e.g., two additional antennas) the UE may modify the CQI on a second carrier frequency so that the UE may be scheduled on a first carrier (with four receive antennas) to improve the overall scheduling capacity. Other reports beyond CQI may be used. For instance, other reports including pre-coding matrix indicator (PMI) and rank indicator (RI) for LTE may be implemented according to certain aspects of the disclosure.

When the UE is scheduled on the four receiver MIMO mode on a single carrier frequency, the eNodeB still expects CQI reports on the second carrier frequency. As a result, the UE may still send CQI reports on the second carrier frequency when the user equipment may have lost the carrier diversity capability due to its implementation of the four receiver MIMO mode on a single carrier frequency. In order to maintain the carrier diversity capability, the UE may report CQI measurements to the eNodeB based on two configurations. In one configuration, the UE continues to report a poor CQI on the second carrier in order to use the four receiver MIMO capability on a single carrier. In another configuration, the UE may periodically switch to carrier aggregation mode to allow for CQI measurements on the second carrier frequency. For example, the UE may measure CQI of the second carrier before the loss of four receiver MIMO capability (due to loss of additional antennas) and report the CQI of both carriers to facilitate scheduling on both carriers. In one aspect, the CQI of the second carrier is measured right before the user equipment loses the four receiver MIMO capability.

Figure 9:
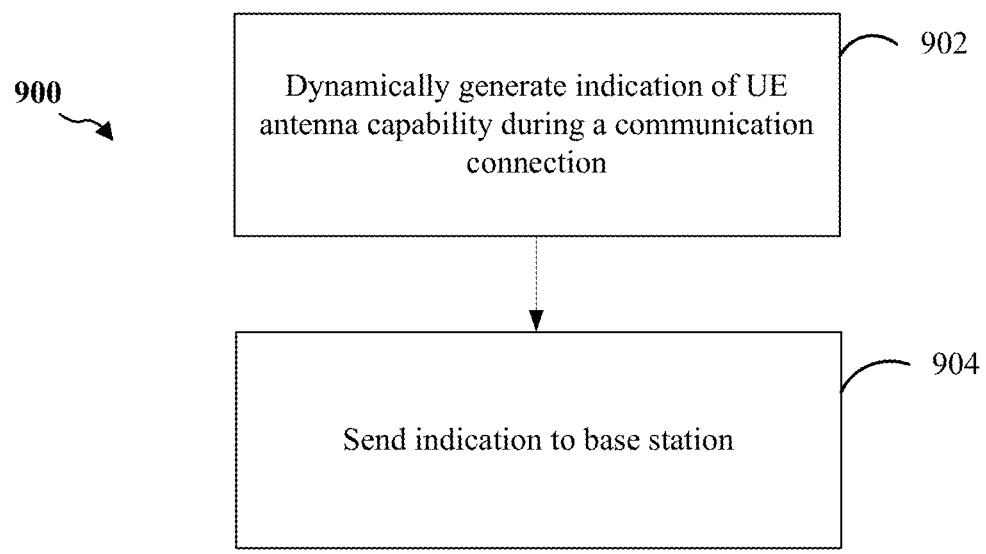
FIG. 9 is a block diagram illustrating a multimode communication method according to one aspect of the present disclosure.

As shown in FIG. 9, an apparatus, such as a UE, may dynamically generate an indication of a user equipment (UE) antenna capability during a communication connection, as shown in block 902. The apparatus may send the indication to a base station, as shown in block 904.

Figure 10:
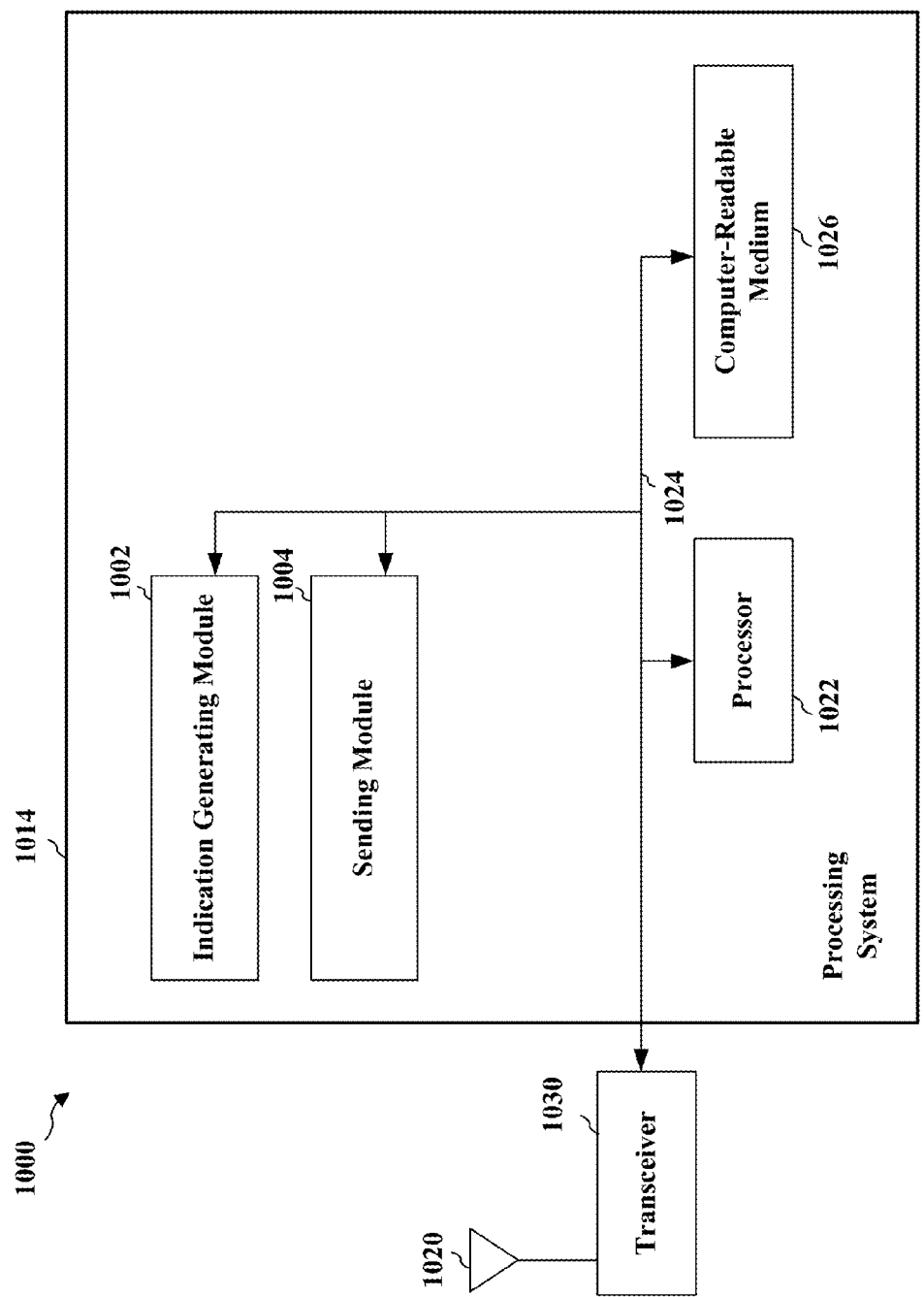
FIG. 10 is a conceptual data flow diagram illustrating the data flow between different modules/means/components in an exemplary apparatus according to one aspect of the present disclosure.

FIG. 10 is a diagram illustrating an example of a hardware implementation for an apparatus 1000 employing a dynamic user equipment scheduling system 1014. The dynamic user equipment scheduling system 1014 may be implemented with a bus architecture, represented generally by a bus 1024. The bus 1024 may include any number of interconnecting buses and bridges depending on the specific application of the dynamic user equipment scheduling system 1014 and the overall design constraints. The bus 1024 links together various circuits including one or more processors and/or hardware modules, represented by a processor 1022, an indication generating module 1002 and a sending module 1004, and a computer-readable medium 1026. The bus 1024 may also link various other circuits such as timing sources, peripherals, voltage regulators, and power management circuits, which are well known in the art, and therefore, will not be described any further.

The apparatus includes the dynamic user equipment scheduling system 1014 coupled to a transceiver 1030. The transceiver 1030 is coupled to one or more antennas 1020. The transceiver 1030 provides a means for communicating with various other apparatus over a transmission medium. The dynamic user equipment scheduling system 1014 includes the processor 1022 coupled to the computer-readable medium 1026. The processor 1022 is responsible for general processing, including the execution of software stored on the computer-readable medium 1026. The software, when executed by the processor 1022, causes the dynamic user equipment scheduling system 1014 to perform the various functions described supra for any particular apparatus. The computer-readable medium 1026 may also be used for storing data that is manipulated by the processor 1022 when executing software. The dynamic user equipment scheduling system 1014 further includes the indication generating module 1002 for dynamically generating an indication of a user equipment antenna capability during a communication connection and the sending module 1004 for sending the indication to a base station. The indication generating module 1002 and the sending module 1004 may be software modules running in the processor 1022, resident/stored in the computer readable medium 1026, one or more hardware modules coupled to the processor 1022, or some combination thereof. The dynamic user equipment scheduling system 1014 may be a component of the UE 120 and may include the memory 682 and/or the controller/processor 680.

In one configuration, the apparatus 1000 for wireless communication includes means for generating an indication. The means may be the UE 102/206/120, controller/processor 680, memory 682, indication generating module 1002 and/or the dynamic user equipment scheduling system 1014 of the apparatus 1000 configured to perform the functions recited by the dynamic indication generating means. As described above, the dynamic user equipment scheduling system 1014 may be a component of the UE 120 and may include the memory 682 and/or the controller/processor 680. In another aspect, the aforementioned means may be any module or any apparatus configured to perform the functions recited by the aforementioned means.

In one configuration, the apparatus 1000 for wireless communication includes means for sending an indication. The means may be the UE 102/206/120, the antenna 652, transmit processor 664, sending module 1004 and/or the dynamic user equipment scheduling system 1014 of the apparatus 1000 configured to perform the functions recited by the means. As described above, the dynamic user equipment scheduling system 1014 may be a component of the UE 120 and may include the memory 682 and/or the controller/processor 680. In another aspect, the aforementioned means may be any module or any apparatus configured to perform the functions recited by the aforementioned means.

Figure 11:
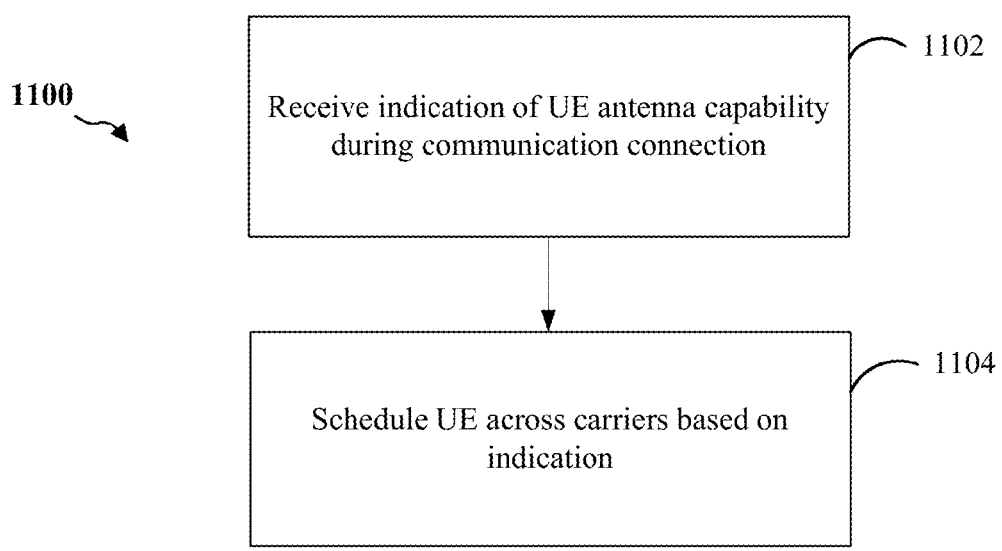
FIG. 11 is a block diagram illustrating a multimode communication method according to one aspect of the present disclosure.

As shown in FIG. 11 an apparatus, such as a base station, may receive an indication of a user equipment antenna capability during a communication connection, as shown in block 1102. The apparatus may schedule the user equipment across carriers based at least in part on the indication, as shown in block 1104.

Figure 12:
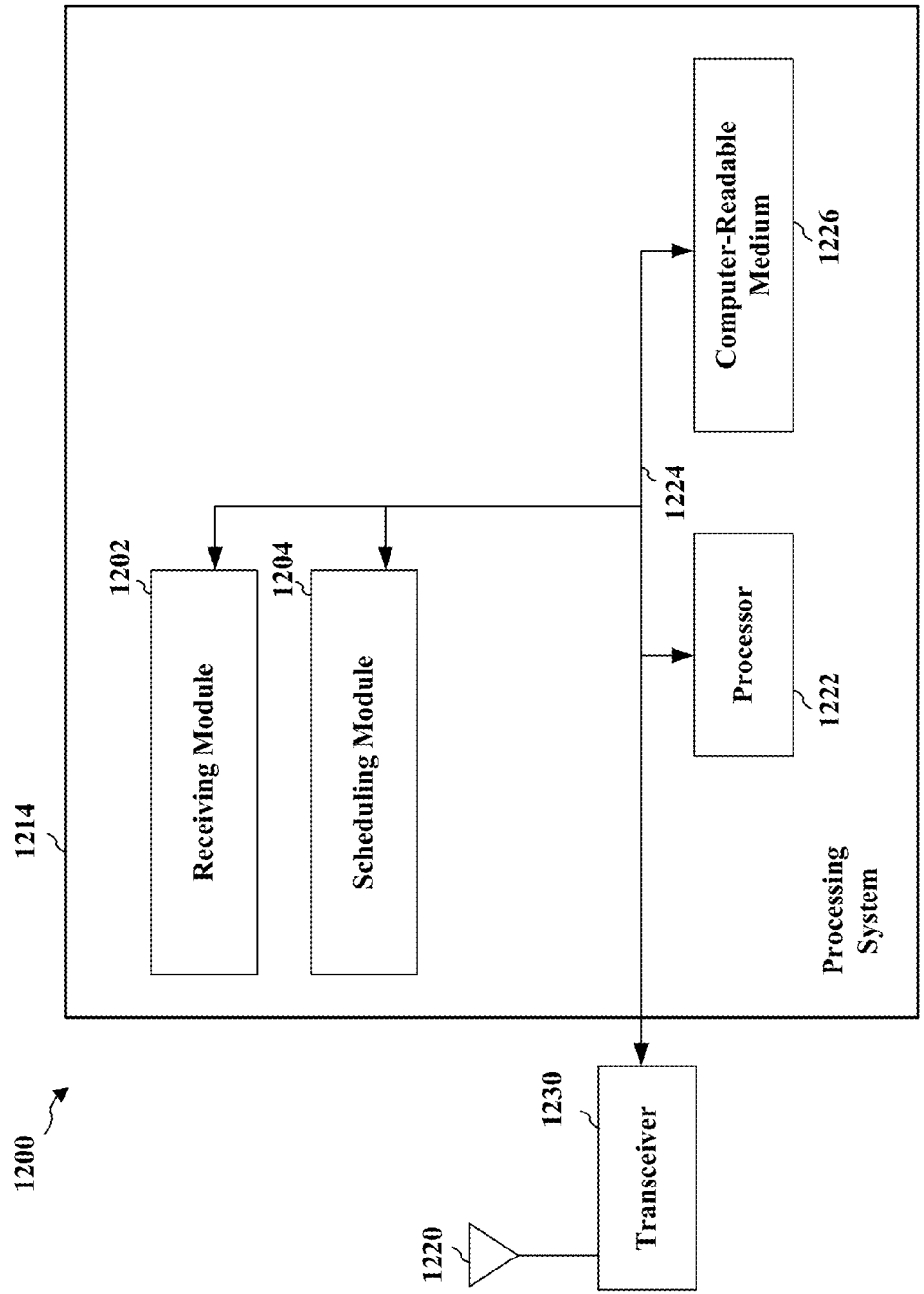
FIG. 12 is a conceptual data flow diagram illustrating the data flow between different modules/means/components in an exemplary apparatus according to one aspect of the present disclosure.

FIG. 12 is a diagram illustrating an example of a hardware implementation for an apparatus 1200 employing a dynamic user equipment scheduling system 1214. The dynamic user equipment scheduling system 1214 may be implemented with a bus architecture, represented generally by a bus 1224. The bus 1224 may include any number of interconnecting buses and bridges depending on the specific application of the dynamic user equipment scheduling system 1214 and the overall design constraints. The bus 1224 links together various circuits including one or more processors and/or hardware modules, represented by a processor 1222, a receiving module 1202 and a scheduling module 1204, and a computer-readable medium 1226. The bus 1224 may also link various other circuits such as timing sources, peripherals, voltage regulators, and power management circuits, which are well known in the art, and therefore, will not be described any further.

The apparatus includes the dynamic user equipment scheduling system 1214 coupled to a transceiver 1230. The transceiver 1230 is coupled to one or more antennas 1220. The transceiver 1230 provides a means for communicating with various other apparatus over a transmission medium. The dynamic user equipment scheduling system 1214 includes the processor 1222 coupled to the computer-readable medium 1226. The processor 1222 is responsible for general processing, including the execution of software stored on the computer-readable medium 1226. The software, when executed by the processor 1222, causes the dynamic user equipment scheduling system 1214 to perform the various functions described supra for any particular apparatus. The computer-readable medium 1226 may also be used for storing data that is manipulated by the processor

1222 when executing software. The dynamic user equipment scheduling system 1214 further includes the receiving module 1202 for receiving an indication of a user equipment antenna capability during a communication connection and the scheduling module 1204 for scheduling the user equipment across carriers based at least in part on the indication. The receiving 1202 and the scheduling module 1204 may be software modules running in the processor 1222, resident/stored in the computer readable medium 1226, one or more hardware modules coupled to the processor 1222, or some combination thereof. The dynamic user equipment scheduling system 1214 may be a component of the eNodeB 110 and may include the memory 642 and/or the controller/processor 640.

In one configuration, the apparatus 1200 for wireless communication includes means for receiving. The means may be the eNodeB 110, controller/processor 640, memory 642, receiving module 1202 and/or the dynamic user equipment scheduling system 1214 of the apparatus 1200 configured to perform the functions recited by the means. As described above, the dynamic user equipment scheduling system 1214 may be a component of the eNodeB 110 and may include the memory 642 and/or the controller/processor 640. In another aspect, the aforementioned means may be any module or any apparatus configured to perform the functions recited by the aforementioned means.

In one configuration, the apparatus 1200 for wireless communication includes means for scheduling. The means may be the eNodeB 110, the antenna 634, scheduler 644, scheduling module 1204 and/or the dynamic user equipment scheduling system 1214 of the apparatus 1200 configured to perform the functions recited by the means. As described above, the dynamic user equipment scheduling system 1214 may be a component of the eNodeB 110 and may include the memory 642 and/or the controller/processor 640. In another aspect, the aforementioned means may be any module or any apparatus configured to perform the functions recited by the aforementioned means.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of wireless communication, comprising:
   dynamically updating a user equipment (UE) receive antenna availability for a specific radio access technology (RAT) when a receive antenna, of multiple antennas, for downlink communication for the specific RAT of the UE becomes available or unavailable to the UE after a start of a communication connection, the receive antenna capable of switching between different RATs, the updating based at least in part on a change in a number of receive antennas available for the specific RAT;

dynamically generating an indication of the updated UE antenna capability for the specific RAT after the start of the communication connection by dynamically generating a modified UE communications report to bias a base station scheduling toward at least one of a single carrier frequency mode or a carrier aggregation mode, wherein the single carrier frequency mode has more receive antennas for the downlink communication than the carrier aggregation mode;

sending the indication to the base station to reschedule the UE for communication in accordance with the updated UE receive antenna availability; and communicating based at least in part on the rescheduling.

2. The method of claim 1, further comprising periodically switching to a carrier aggregation mode to allow for channel quality indicator measurements on a second carrier frequency when the UE is scheduled on a single carrier frequency.

3. The method of claim 1, further comprising operating in at least one of single carrier frequency mode or carrier aggregation mode based on the indication.

4. The method of claim 1, further comprising wirelessly communicating over a long term evolution network.

5. An apparatus for wireless communication, comprising:
means for dynamically updating a user equipment (UE) receive antenna availability for a specific radio access technology (RAT) when a receive antenna, of multiple antennas, for downlink communication for the specific RAT of the UE becomes available or unavailable to the UE after a start of a communication connection, the receive antenna capable of switching between different RATs, the updating based at least in part on a change in a number of receive antennas available for the specific RAT;

means for dynamically generating an indication of the updated UE antenna capability for the specific RAT after the start of the communication connection by dynamically generating a modified UE communications report to bias a base station scheduling toward at least one of a single carrier frequency mode or a carrier aggregation mode, wherein the single carrier frequency mode has more receive antennas for the downlink communication than the carrier aggregation mode;

means for sending the indication to the base station to reschedule the UE for communication in accordance with the updated UE receive antenna availability; and means for communicating based at least in part on the rescheduling.

6. The apparatus of claim 5, further comprising means for periodically switching to the carrier aggregation mode to allow for channel quality indicator measurements on a second carrier frequency when the UE is schedule on a single carrier frequency.

7. The apparatus of claim 5, further comprising means for operating in at least one of single carrier frequency mode or carrier aggregation mode based on the indication.

8. An apparatus for wireless communication, comprising:
a memory; and
at least one processor coupled to the memory and configured:
to dynamically update a user equipment (UE) receive antenna availability for a specific radio access technology (RAT) when a receive antenna, of multiple antennas, for downlink communication for the specific RAT of the UE becomes available or unavailable to the UE after a start of a communication connection, the receive antenna capable of switching between different RATs, the updating based at least in part on a change in a number of receive antennas available for the specific RAT;

to dynamically generate an indication of the updated UE receive antenna availability for the specific RAT after the start of the communication connection by dynamically generating a modified UE communications report to bias a base station scheduling toward at least one of a single carrier frequency mode or a carrier aggregation mode, wherein the single carrier frequency mode has more receive antennas for the downlink communication than the carrier aggregation mode;

to send the indication to a base station to reschedule the UE for communication in accordance with the updated UE receive antenna availability; and to communicate based at least in part on the rescheduling.

9. The apparatus of claim 8, in which the at least one processor is further configured to periodically switch to a carrier aggregation mode to allow for channel quality indicator measurements on a second carrier frequency when the UE is scheduled on a single carrier frequency.

10. The apparatus of claim 8, in which the at least one processor is further configured to operate in at least one of single carrier frequency mode or carrier aggregation mode based on the indication.

11. The apparatus of claim 8, in which the at least one processor is further configured to wirelessly communicate over a long term evolution network.

12. A non-transitory computer-readable medium having non-transitory program code recorded thereon, the program code comprising:
program code to dynamically update a user equipment (UE) receive antenna availability for a specific radio access technology (RAT) when a receive antenna, of multiple antennas, for downlink communication for the specific RAT of the UE becomes available or unavailable to the UE after a start of a communication connection, the receive antenna capable of switching between different RATs, the updating based at least in part on a change in a number of receive antennas available for the specific RAT;

program code to dynamically generate an indication of the updated UE receive antenna availability for the specific RAT during the communication connection including dynamically generating a modified UE communications report to bias a base station scheduling toward at least one of a single carrier frequency mode or a carrier aggregation mode, wherein the single carrier frequency mode has more receive antennas for the downlink communication than the carrier aggregation mode;

program code to send the indication to the base station to reschedule the UE for communication in accordance with the updated UE receive antenna availability; and program code to communicate based at least in part on the rescheduling.

13. The non-transitory computer-readable medium of claim 12, in which the program code is further configured to periodically switch to the carrier aggregation mode to allow for channel quality indicator measurements on a second carrier frequency mode when the UE is schedule on a single carrier frequency.

14. The non-transitory computer-readable medium of claim 12, in which the program code is further configured to operate in at least one of single carrier frequency mode or carrier aggregation mode based on the indication.

15. A method of wireless communication, comprising:
receiving an indication of a user equipment (UE) receive antenna availability for a specific radio access technology (RAT) when a receive antenna, of multiple antennas, for downlink communication for the specific RAT of the UE becomes available or unavailable to the UE after a start of a communication connection, the receive antenna capable of switching between different RATs, the indication including a modified UE communications report to bias a base station scheduling toward at least one of a single carrier frequency mode or a carrier aggregation mode, wherein the single carrier frequency mode has more receive antennas for the downlink communication than the carrier aggregation mode, the updated UE receive antenna availability based at least in part on a change in a number of receive antennas available for the specific RAT; and
rescheduling the UE across one or more carriers based at least in part on the indication.

16. The method of claim 15, further comprising wirelessly communicating over a long term evolution network.

17. An apparatus for wireless communication, comprising:
means for receiving an indication of an updated (UE) receive antenna availability for a specific radio access technology (RAT) when a receive antenna, of multiple antennas, for downlink communication for the specific RAT of the UE becomes available or unavailable to the UE after a start of a communication connection, the receive antenna capable of switching between different RATs, the indication including a modified UE communications report to bias a base station scheduling toward at least one of a single carrier frequency mode or a carrier aggregation mode, wherein the single carrier frequency mode has more receive antennas for the downlink communication than the carrier aggregation mode, the updated UE receive antenna availability based at least in part on a change in a number of receive antennas available for the specific RAT; and
means for rescheduling the UE across one or more carriers based at least in part on the indication.

18. An apparatus for wireless communication, comprising:
a memory; and
at least one processor coupled to the memory and configured:
to receive an indication of an updated user equipment (UE) receive antenna availability for a specific radio access technology (RAT) when a receive antenna, of multiple antennas, for downlink communication for the specific RAT of the UE becomes available or unavailable to the UE after a start of a communication connection, the receive antenna capable of switching between different RATs, the indication including a modified UE communications repot to bias a base station scheduling toward at least one of a single carrier frequency mode or a carrier aggregation mode, wherein the single carrier frequency mode has more receive antennas for the downlink communication than the carrier aggregation mode, the updated UE receive antenna availability based at least in part on a change in a number of receive antennas available for the specific RAT; and
to reschedule the UE across one or more carriers based at least in part on the indication.

19. The apparatus of claim 18, in which the at least one processor is further configured to wirelessly communicate over a long term evolution network.

20. A non-transitory computer-readable medium having non-transitory program code recorded thereon, the program code comprising:
program code to receive an indication of an updated user equipment (UE) receive antenna availability for a specific radio access technology (RAT) when a receive antenna, of multiple antennas, for downlink communication for the specific RAT of the UE becomes available or unavailable to the UE after a start of a communication connection, the receive antenna capable of switching between different RATs, the indication including a modified UE communication report to bias a base station scheduling toward at least one of a single carrier frequency mode or a carrier aggregation mode, wherein the single carrier frequency mode has more receive antennas for the downlink communication than the carrier aggregation mode, the updated UE antenna capability based at least in part on a change in a number of receive antennas available for the specific RAT; and
program code to reschedule the UE across one or more carriers based at least in part on the indication.

* * * * *